United States Patent
Yamanaka et al.

(10) Patent No.: US 10,553,885 B2
(45) Date of Patent: Feb. 4, 2020

(54) POWER SUPPLY SYSTEM AND VOLTAGE CONTROL METHOD OF FUEL CELL

(71) Applicant: TOYOTA JIDOSHA KABUSHIKI KAISHA, Toyota-shi, Aichi-ken (JP)

(72) Inventors: Tomio Yamanaka, Nagoya (JP); Mitsuhiro Nada, Toyota (JP); Hiroyuki Suzuki, Ama (JP); Tomohiro Ogawa, Toyota (JP); Tsuyoshi Maruo, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 903 days.

(21) Appl. No.: 14/938,153

(22) Filed: Nov. 11, 2015

(65) Prior Publication Data

US 2016/0141682 A1    May 19, 2016

(30) Foreign Application Priority Data

Nov. 15, 2014  (JP) ................... 2014-232251

(51) Int. Cl.
*H01M 8/04746* (2016.01)
*H01M 8/04089* (2016.01)
*H01M 8/04537* (2016.01)
*H01M 8/04858* (2016.01)
*H01M 8/04119* (2016.01)

(52) U.S. Cl.
CPC ..... *H01M 8/04753* (2013.01); *H01M 8/0488* (2013.01); *H01M 8/04089* (2013.01); *H01M 8/04604* (2013.01); *H01M 8/04179* (2013.01); *H01M 2250/20* (2013.01); *Y02T 90/32* (2013.01)

(58) Field of Classification Search
CPC ......... H01M 8/04753; H01M 8/04089; H01M 8/04179; H01M 8/04298
See application file for complete search history.

(56) References Cited

U.S. PATENT DOCUMENTS

2010/0068576 A1    3/2010  Hamada et al.

FOREIGN PATENT DOCUMENTS

| JP | 2011-06586 A | 3/2011 |
| JP | 2012-59557 | 3/2012 |
| JP | 2013-021854 A | 1/2013 |
| JP | 2013-161571 | 8/2013 |
| WO | WO2013-150619 A1 | 10/2013 |

OTHER PUBLICATIONS

English-language machine translation of Notification of Reason for Refusal issued in Japanese patent application No. 2014-232251 on Mar. 7, 2017.

*Primary Examiner* — Ladan Mohaddes
(74) *Attorney, Agent, or Firm* — Finnegan, Henderson, Farabow, Garrett & Dunner, LLP

(57) ABSTRACT

An object is to maintain the voltage of a fuel cell at a desired voltage level and suppress a voltage variation, even in the case of a low load request. A power supply system including a fuel cell causes at least part of a required electric power to be supplied from the fuel cell in an ordinary load state. In a low load state, the power supply system supplies an amount of oxygen that is required to make the voltage of the fuel cell equal to a predetermined target voltage and that is less than an amount of oxygen supplied to the fuel cell in the ordinary load state, to the fuel cell. In a first low load state, the power supply system sets the target voltage to a first target voltage and supplies oxygen to the fuel cell. After a subsequent shift to a state that the required electric power becomes higher than a predetermined reference value to cause the fuel cell to generate electric power at an output voltage that is higher than the first target voltage, in a further shift to a second low load state, the power supply system sets the target voltage to a second target voltage that is higher than the first target voltage and supplies oxygen to the fuel cell.

7 Claims, 8 Drawing Sheets

POWER SUPPLY SYSTEM AND VOLTAGE CONTROL METHOD OF FUEL CELL

CROSS-REFERENCE TO RELATED APPLICATIONS

The present application claims priority from Japanese patent application P2014-232251 filed on Nov. 15, 2014, the entirety of disclosure of which is hereby incorporated by reference into this application.

BACKGROUND

Field

The present invention relates to a power supply system and a voltage control method of a fuel cell.

Related Art

In a power supply system that includes a fuel cell and is configured to cause an electric power to be taken out of the power supply system in response to a required electric power from a load (hereinafter may be referred to as load request), the load request may temporarily have a significant decrease even during operation of the power supply system. The power supply system including the fuel cell is generally characterized by that the energy efficiency of the entire system decreases with a significant decrease in amount of electric power generated by the fuel cell. Accordingly, in response to an extremely low load request for the power supply system, a conventional control procedure stops power generation of the fuel cell. In response to the load request, a secondary battery provided along with the fuel cell in the power supply system is activated to output the required electric power.

When power generation of the fuel cell is stopped in a state that hydrogen remains in an anode-side flow path of the fuel cell and oxygen remains in a cathode-side flow path, the fuel cell shows an extremely high open circuit voltage (OCV). An excessive increase in open circuit voltage of the fuel cell results in excessively increasing the electrode potential at an electrode (cathode) of the fuel cell. This causes elution (degradation) of a catalyst to proceed at the cathode and thereby reduces the power generation performance and the durability of the fuel cell.

After stop of power generation of the fuel cell, hydrogen remaining in the anode-side flow path is transmitted through an electrolyte membrane of the fuel cell to the cathode-side flow path, and an oxidation reaction of the transmitted hydrogen proceeds at the cathode. As a result, after some time since stop of power generation of the fuel cell, the open circuit voltage is deceased cathode potential is decreased), due to consumption of oxygen remaining in the cathode-side flow path. In this case, the cathode catalyst is reduced, so that the cathode catalyst is more likely to be eluted with a subsequent rise of the cathode potential. In the case of a significant decrease of the load request, there is accordingly a need to maintain the voltage of the fuel cell (electrode potential) in an adequate range, in order to suppress deterioration of the catalyst.

A proposed method to maintain the voltage of the fuel cell in an adequate range in response to a significant decrease of the load request continues low power generation in the fuel cell even after the significant decrease of the load request (JP 2013-161571A). For example, a proposed method to continue low power generation stops the supply of oxygen to the fuel cell until the output voltage of the fuel cell decreases to reach a lower limit in a predetermined range, and continues the supply of oxygen to the fuel cell until the output voltage that has been decreased to the lower limit increases to reach an upper limit in the predetermined range.

The control of repeating the supply and the stop of oxygen to the fuel described above, however, causes the output voltage of the fuel cell to be varied between the lower limit and the upper limit in the predetermined range. In the fuel cell, it is expected that the electrode catalyst is more likely to be eluted at the higher electrode potential. In the case where the electrode potential temporarily decreases and subsequently increases, it is expected that the electrode catalyst is more likely to be eluted at the higher degree of decrease of the electrode potential and the higher degree of subsequent increase of the electrode potential. Accordingly there is a need to not only prevent an extremely high electrode potential and an extremely low electrode potential but suppress a variation in voltage of the fuel cell (electrode potential), in order to suppress deterioration of the electrode catalyst and improve the durability of the fuel cell. During continuation of the state having an extremely low load request, the load request may be varied temporarily as mentioned above. It is desirable to suppress a voltage variation even in such a case. Conventionally, control involving a temporary variation in load request has not been sufficiently examined.

SUMMARY

In order to solve at least part of the above problems, the invention may be implemented by any of the following aspects.

(1) According to one aspect of the invention, in a power supply system comprising a fuel cell that supplies electric power to a load, there is provided a voltage control method of the fuel cell. The voltage control method of the fuel cell comprises: in an ordinary load state that a required electric power from the load is higher than a predetermined reference value, causing at least part of the required electric power to be supplied from the fuel cell; and in a low load state that the required electric power is equal to or lower than the predetermined reference value, supplying an amount of oxygen that is required to make a voltage of the fuel cell equal to a predetermined target voltage and that is less than an amount of oxygen supplied to the fuel cell in the ordinary load state, to the fuel cell. In a first low load state that the required electric power is equal to or lower than the predetermined reference value, setting the target voltage to a first target voltage and supplying oxygen to the fuel cell. After a subsequent shift to a state that the required electric power becomes higher than the predetermined reference value to cause the fuel cell to generate electric power at an output voltage that is higher than the first target voltage, in a further shift to a second low load state that the required electric power is equal to or lower than the predetermined reference value, setting the target voltage to a second target voltage that is higher than the first target voltage and supplying oxygen to the fuel cell.

In the first low load state, the voltage control method of the fuel cell according to this aspect sets the target voltage to the first target voltage and supplies oxygen to the fuel cell. After subsequent power generation of the fuel cell at an output voltage that is higher than the first target voltage, in a shift to the second low load state, the voltage control method sets the target voltage to the second target voltage that is higher than the first target voltage. This suppresses a variation in electrode potential of the fuel cell and suppresses elution of the electrode catalyst, thus enhancing the durability of the fuel cell.

(2) The voltage control method of the fuel cell according to the above aspect may further comprise, in the first low load state and in the second low load state, selecting one operation mode among a plurality of operation modes. The plurality of operation modes may include a non-power generation mode that electrically disconnects the fuel cell from the load and supplies an amount of oxygen that is required to make an open circuit voltage of the fuel cell equal to the target voltage, to the fuel cell; and a low power generation mode that is an operation mode of supplying electric power from the fuel cell to the load and that controls the output voltage of the fuel cell to approach the target voltage and supplies a required amount of oxygen that is theoretically determined from a predetermined target amount of power generation of the fuel cell, to the fuel cell.

In the low load state that the required electric power from the load is equal to or lower than the predetermined reference value, the voltage control method of the fuel cell according to this aspect suppresses excessive power generation while maintaining the output voltage of the fuel cell in a desirable range.

(3) The voltage control method of the fuel cell according to the above aspect may further comprise in the first low load state, selecting the non-power generation mode to supply oxygen to the fuel cell, and in the second low load state, selecting the low power generation mode to supply oxygen to the fuel cell.

The voltage control method of the fuel cell according to this aspect selects the non-power generation mode prior to the low power generation mode, in response to a shift to the low load state. This suppresses excessive power generation of the fuel cell in the low load state and improves the energy efficiency of the power supply system. The voltage control method of the fuel cell according to this aspect causes the fuel cell to generate electric power in a subsequent shift to a state that the required electric power becomes higher than the reference value after selection of the non-power generation mode. In a further shift to the low load state, the voltage control method selects the low power generation mode. Even in the case of continuation of the low load state, at least part of a load request needed in equipment including the power supply system can be covered by the electric power generated by the fuel cell. For example, in an application that the power supply system further includes a power storage unit (power storage unit that is capable of storing at least part of electric power generated by the fuel cell and is capable of supplying electric power to the load), this configuration suppresses reduction in state of charge of the power storage unit after a further shift to the low load state. As a result, this reduces the frequency of charging the power storage unit after a further shift to the low load state.

(4) In the voltage control method of the fuel cell according to the above aspect, the load may include a main load and an auxiliary load that has a lower required electric power than the main load. The ordinary load state may be a state that requires electric power from at least the main load. The low load state including the first low load state and the second low load state may be a state that requires electric power from the auxiliary load without requiring electric power from the main load.

In a shift from a state that the main load requires electric power to the low load state, the voltage control method of the fuel cell according to this aspect selects the non-power generation mode, prior to the low power generation mode. This improves the energy efficiency of the entire system.

(5) The voltage control method of the fuel cell according to the above aspect may further comprise during continuation of a state that selects the low power generation mode, upon satisfaction of a liquid water accumulation condition that liquid water produced in the fuel cell during power generation a the fuel cell in the low power generation mode is excessively accumulated in the fuel cell, temporarily interrupting control in the low power generation mode and supplying an excess amount of oxygen that is higher than an amount of oxygen supplied to the fuel cell in the low power generation mode, to the fuel cell.

Even during continuation of the state that selects the low power generation mode, the voltage control method of the fuel cell according to this aspect removes liquid water from the fuel cell and suppresses an excess amount of liquid water from being accumulated in the fuel cell.

(6) In the voltage control method of the fuel cell according to the above aspect, the power supply system may comprise, as part of the load, a power storage unit that is capable of storing at least part of electric power generated by the fuel cell in selection of the low power generation mode. The voltage control method of the fuel cell may further comprise during continuation of the state that selects the low power generation mode, upon satisfaction of the liquid water accumulation condition, reducing the target amount of power generation of the fuel cell and causing the fuel cell to generate electric power, prior to temporarily interrupting the control in the low power generation mode.

The voltage control method of the fuel cell according to this aspect reduces the state of charge of the power storage unit by temporarily decreasing the target amount of power generation of the fuel cell. Even in the case of a subsequent temporary increase in amount of power generation of the fuel cell by supplying an excess amount of oxygen that is higher than the amount of oxygen supplied to the fuel cell in the low power generation mode, to the fuel cell, this enables the power storage unit to be charged with the increased amount of power generation without any difficulty.

(7) According to another aspect, there is provided a power supply system comprising a fuel cell that supplies electric power to a load. The power supply system comprises an oxygen supply system that is configured to supply oxygen to a cathode of the fuel cell and an oxygen supply regulator that is configured to drive the oxygen supply system and regulate an amount of oxygen that is supplied to the cathode by the oxygen supply system. In an ordinary load state that a required electric power from the load is higher than a predetermined reference value, the oxygen supply regulator drives the oxygen supply system to supply an amount of oxygen that causes at least part of the required electric power to be supplied from the fuel cell, to the cathode. In a low load state that the required electric power is equal to or lower than the predetermined reference value, the oxygen supply regulator drives the oxygen supply system to supply an amount of oxygen that is required to make a voltage of the fuel cell equal to a predetermined target voltage and that is less than an amount of oxygen supplied to the fuel cell in the ordinary load state, to the cathode. In a first low load state that the required electric power is equal to or lower than the predetermined reference value, the oxygen supply regulator sets the target voltage to a first target voltage and drives the oxygen supply system. After a subsequent shift to a state that the required electric power becomes higher than the predetermined reference value to cause the fuel cell to generate electric power at an output voltage that is higher than the first target voltage, in a further shift to to a second low load state that the required electric power is equal to or lower than the predetermined reference value, the oxygen supply regulator sets the target voltage to a second target voltage that is higher than the first target voltage and drives the oxygen supply system.

In the first low load state, the power supply system according to this aspect sets the target voltage to the first target voltage and drives the oxygen supply system. After subsequent power generation of the fuel cell at an output voltage that is higher than the first target voltage, in a shift to the second low load state, the power supply system sets the target voltage to the second target voltage that is higher than the first target voltage and drives the oxygen supply system. This suppresses a variation in electrode potential of the fuel cell and suppresses elution of the electrode catalyst, thus enhancing the durability of the fuel cell.

The invention may be implemented by any of various aspects other than those described above, for example, a moving body with a power supply system mounted thereon as a power supply for driving, a high potential avoiding control method of a fuel cell in a power supply system including the fuel cell, a computer program that implements the voltage control method described above or the high potential avoiding control method, or a non-transitory storage medium in which the computer program is stored.

DESCRIPTION OF THE EMBODIMENTS

A. General Configuration of Power Supply System

Figure 1:
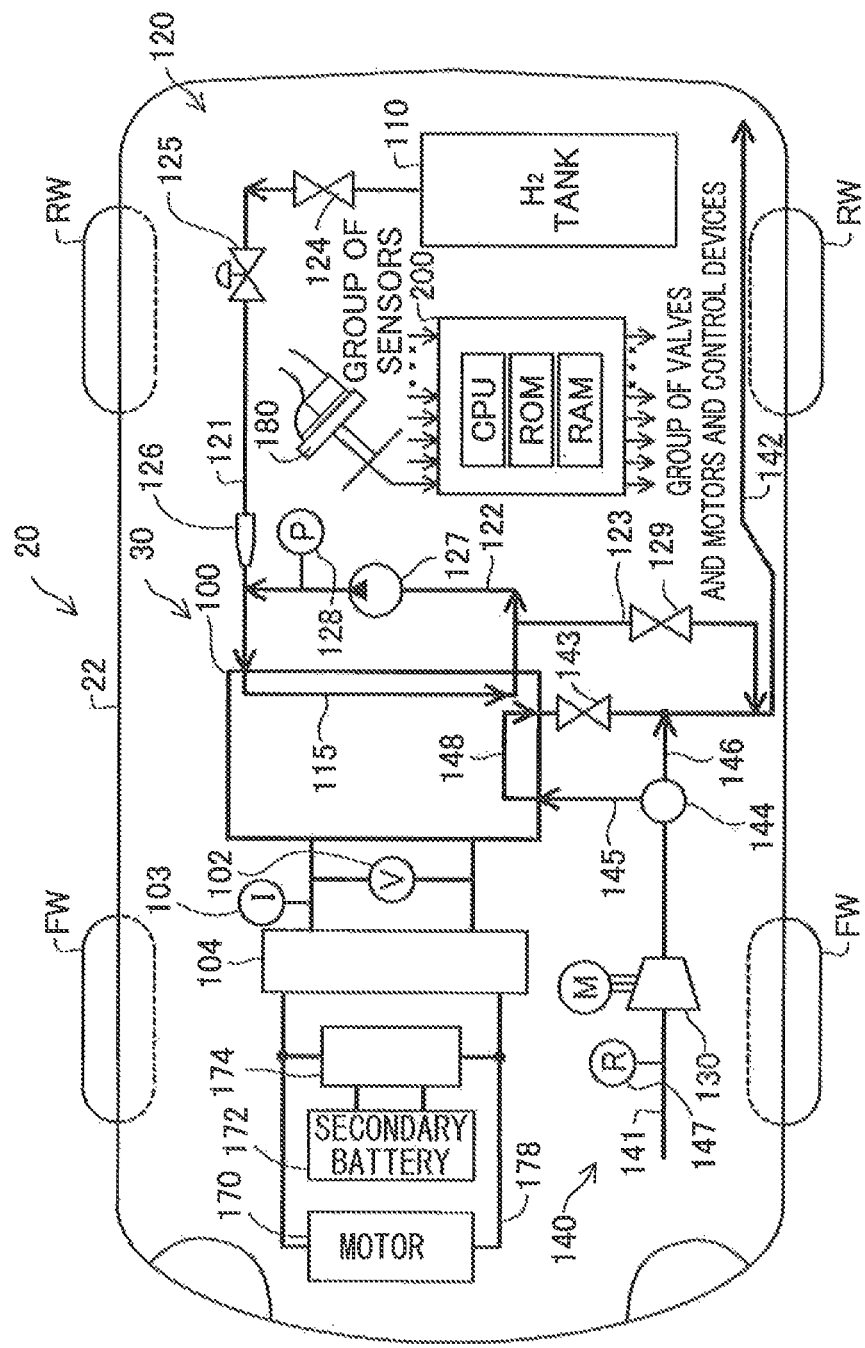
FIG. 1 is a block diagram illustrating the schematic configuration of a fuel cell vehicle.

FIG. 1 is a block diagram illustrating the schematic configuration of a fuel cell vehicle 20 according to one embodiment of the invention. The fuel cell vehicle 20 has a power supply system 30 mounted on a vehicle body 22. The power supply system 30 is connected with a motor 170 for driving the fuel cell vehicle 20 by a wiring 178, such that electric power is transmitted between the power supply system 30 and the motor 170 via the wiring 178.

The power supply system 30 includes a fuel cell 100, a hydrogen gas supply system 120 including a hydrogen tank 110, an air supply system 140 including a compressor 130, a secondary battery 172, a DC/DC converter 104, a DC/DC converter 174 and a controller 200. The power supply system 30 further includes a cooling medium circulation system (not shown) that is configured to make a flow of and circulate a cooling medium for cooling down the fuel cell 100 in the fuel cell 100, in order to keep the temperature of the fuel cell 100 in a predetermined range. The power supply system 30 is configured such that electric power is suppliable to a load including the motor 170 from either one of the fuel cell 100 and the secondary battery 172 alone or from both the fuel cell 100 and the secondary battery 172 simultaneously.

The fuel cell 100 has stacked structure by stacking a plurality of unit cells. The fuel cell 100 of this embodiment is a polymer electrolyte fuel cell. A flow path configured to make a flow of hydrogen to an anode side (hereinafter this flow path is referred to as anode-side flow path 115) and a flow path configured to make a flow of oxygen to a cathode side (hereinafter this flow path is referred to as cathode-side flow path 148) are formed across an electrolyte membrane in each of the unit cells of the fuel cell 100. FIG. 1 schematically illustrates the anode-side flow path 115 and the cathode-side flow path 148 formed inside of the fuel cell 100. The fuel cell 100 is connected with the load including the motor 170 via the DC/DC converter 104 and the wiring 178. A voltage sensor 102 is provided to detect the voltage of the fuel cell 100. A current sensor 103 is provided on the wiring 178 to detect the output current of the fuel cell 100. The detection signals of the voltage sensor 102 and the current sensor 103 are output to the controller 200.

The DC/DC converter 104 serves to change the output condition of the fuel cell 100 in response to a control signal from the controller 200. More specifically the DC/DC converter 104 serves to set an output voltage in the course of power generation by the fuel cell 100. The DC/DC converter 104 also serves to boost up the output voltage to a desired voltage in the course of supplying electric power generated by the fuel cell 100 to the load. The DC/DC converter 104 includes a diode (not shown). Providing the diode in the DC/DC converter 104 electrically disconnects the fuel cell 100 from the load when the output current of the fuel cell 100 decreases to or below a predetermined level. The diode provided in the DC/DC converter 104 according to this embodiment corresponds to the "load disconnecter" in SUMMARY.

The hydrogen tank 110 included in the hydrogen gas supply system 120 may be, for example, a hydrogen tank that stores high-pressure hydrogen gas or a tank filled with a hydrogen storage alloy that serves to absorb hydrogen and thereby store hydrogen. The hydrogen gas supply system 120 includes a hydrogen supply path 121 that is arranged to connect the hydrogen tank 110 with the fuel cell 100, a circulation path 122 that is arranged to circulate unconsumed hydrogen gas (anode off-gas) to the hydrogen supply path 121, and a hydrogen release path 123 that is arranged to release the anode off-gas to the atmosphere. In the hydrogen gas supply system 120, hydrogen gas stored in the hydrogen tank 110 flows through the hydrogen supply path 121 that is opened and closed by an on-off valve 124, is subjected to pressure reduction by a pressure reducing valve 125 and is supplied from a hydrogen supply device 126 (for example, injector) located downstream of the pressure reducing valve 125 to the anode-side flow path 115 of the fuel cell 100. The flow rate of hydrogen circulated through the circulation path 122 is regulated by a circulation pump 127. The controller 200 regulates the driving amounts of the hydrogen supply device 126 and the circulation pump 127 in response to a load request by referring to the pressure of the circulated flow of hydrogen detected by a pressure sensor 128.

Part of the hydrogen gas flowing through the circulation path 122 flows through the hydrogen release path 123 that is branched off from the circulation path 122 and is opened and closed by an on-off valve 129 and is released to the atmosphere at a predetermined timing. This causes impurities (for example, water vapor and nitrogen) other than hydrogen included in the hydrogen gas circulated through the circulation path 122 to be discharged out of the flow path and thereby suppresses an increase in concentration of the impurities included in the hydrogen gas supplied to the fuel cell 100. The controller 200 controls the opening and closing of the on-off valve 129.

The air supply system 140 includes a first air flow path 141, a second air flow path 145, a third air flow path 146, a flow-dividing valve 144, an air release path 142, a back pressure valve 143 and a flow rate sensor 147, in addition to the compressor 130. The first air flow path 141 is provided as a flow path which the entire flow of the air taken in by the compressor 130 flows through. The second air flow path 145 and the third air flow path 146 are branched off from the first air flow path 141. The flow-dividing valve 144 is placed at a branching position where the first air flow path 141 branches off to the second air flow path 145 and the third air flow path 146. Regulating the valve-opening position of this flow-dividing valve 144 changes the flow split ratio of the air flowing from the first air flow path 141 into the second air flow path 145 or the third air flow path 146. Part of the second air flow path 145 forms the cathode-side flow path 148 in the fuel cell 100. The third air flow path 146 serves as a bypass flow path configured to introduce the air with bypassing the fuel cell 100. The second air flow path 145 and the third air flow path 146 are joined to the air release path 142. The back pressure valve 143 is a throttle valve that is provided in the second air flow path 145 to be located downstream of the cathode-side flow path 148 and upstream of the connecting point with the third air flow path 146. Regulating the valve-opening position of the back pressure valve 143 changes the back pressure of the cathode-side flow path 148 in the fuel cell 100. The air release path 142 is configured to release the air passing through the third air flow path 146 along with the air (cathode off-gas) passing through the second air flow path 145 to the atmosphere. The hydrogen release path 123 described above is connected with the air release path 142, such that hydrogen flowing through the hydrogen release path 123 is diluted with the air flowing through the air release path 142, before being released to the atmosphere. The flow rate sensor 147 is provided in the first air flow path 141 to detect the total flow rate of the air taken in through the first air flow path 141.

In the air supply system 140, the flow rate of the air (oxygen flow rate) supplied to the cathode-side flow path 148 in the fuel cell 100 is adjustable by changing at least one condition selected among the driving amount of the compressor 130, the valve-opening position of the flow-dividing valve 144 and the valve-opening position of the back pressure valve 143. According to this embodiment, the back pressure valve 143 includes a stepping motor (not shown). The valve-opening position of the back pressure valve 143 is adjustable to any desired position with high accuracy by controlling the number of steps of the stepping motor. The controller 200 regulates the driving amount of the compressor 130, the valve-opening position of the flow-dividing valve 144 and the valve-opening position of the back pressure valve 143. The air supply system 140 may additionally include a humidifier that is provided in, for example, the first air flow path 141 to humidify the air supplied to the fuel cell 100.

The air supply system 140 of this embodiment corresponds to the "oxygen supply system" in SUMMARY. The first air flow path 141 and the second air flow path 142 of the embodiment correspond to the "oxygen supply path" in SUMMARY. The compressor 130 corresponds to the "oxygen introducer" in SUMMARY. The third air flow path 146 corresponds to the "bypass flow path" in SUMMARY. The back pressure valve 143 corresponds to the "flow rate regulator" in SUMMARY.

The secondary battery 172 is connected with the wiring 178 via the DC/DC converter 174. The DC/DC converter 174 and the DC/DC converter 104 are connected in parallel to the wiring 178. For example, a lead acid battery, a nickel hydride battery or a lithium ion battery may be employed for the secondary battery 172. The secondary battery 172 is provided with a state-of-charge monitor (not shown) that is configured to detect the state of charge (SOC) of the secondary battery 172. The detected state of charge is output to the controller 200. The state-of-charge monitor may be configured as an SOC meter that integrates the current value and the time duration of charging and discharging of the secondary battery 172. Alternatively the state-of-charge monitor may be configured as a voltage sensor that detects the voltage of the secondary battery 172, in place of the SOC meter. The secondary battery 172 of this embodiment corresponds to the "power storage unit" in SUMMARY.

The DC/DC converter 174 has charge and discharge control functions to control charging and discharging of the secondary battery 172, and controls charging and discharging of the secondary battery 172 in response to a control signal from the controller 200. The DC/DC converter 174 sets a target voltage on the output side under control of the controller 200 and variably regulates the electric power charged into or discharged from the secondary battery 172 and the voltage level applied to the motor 170. When there is no need to charge or discharge the secondary battery 172, the DC/DC converter 174 disconnects the secondary battery 172 from the wiring 178.

The controller 200 is implemented by a microcomputer including a CPU that performs logical operations, a ROM and a RAM. The controller 200 inputs detection signals from various sensors, for example, an accelerator position sensor 180, a shift position sensor, a vehicle speed sensor and an ambient temperature sensor (not shown), in addition to the sensors included in the hydrogen gas supply system 120 and the air supply system 140 described above and performs various controls of the fuel cell vehicle 20 based on the input detection signals. For example, the controller 200 determines the magnitude of a load request based on, for example, the detection signal of the accelerator position sensor 180 and outputs drive signals to the relevant parts of the power supply system 30 to obtain an electric power corresponding to the load request from at least one of the fuel cell 100 and the secondary battery 172. More specifically, in the case of obtaining electric power from the fuel cell 100, the controller 200 regulates the amounts of gas supply from the hydrogen gas supply system 120 and the air supply system 140, in order to obtain a desired electric power from the fuel cell 100. The controller 200 also controls the DC/DC converters 104 and 174 to make the output voltage of the fuel cell 100 equal to the target voltage or to supply a desired electric power to the motor 170. According to this embodiment, the controller 200 functions as the "oxygen amount regulator", the "operation mode selector" and the "output voltage controller" in SUMMARY. The controller 200 additionally includes a timer that is provided to measure a time elapsed since input of any of various signals or since execution of any of various processes.

B. Operation Mode of Power Supply System

The fuel cell vehicle 20 of the embodiment changes the operation mode among a plurality of operation modes including an ordinary operation mode and an intermittent operation mode during operation of the power supply system 30. The ordinary operation mode is an operation mode that is selected when a load request to the power supply system 30 exceeds a predefined reference value and causes at least part of the load request including a required electric power of the motor 170 to be covered by electric power generated by the fuel cell 100. The intermittent operation mode is an operation mode that is selected when a load request to the power supply system 30 is equal to or lower than the predefined reference value. According to this embodiment, the intermittent operation mode includes a non-power generation mode that stops power generation of the fuel cell 100 and a low power generation mode that causes the fuel cell 100 to perform power generation at a low level.

The load that receives the supply of electric power from the power supply system 30 includes vehicle auxiliary machinery and fuel cell auxiliary machinery, in addition to the motor 170 for driving the fuel cell vehicle 20. In the power supply system 30 of the embodiment, the load request includes a required electric power of the motor 170, a required electric power of the vehicle auxiliary machinery and a required electric power of the fuel cell, auxiliary machinery. The vehicle auxiliary machinery includes, for example, air conditioning equipment, lighting devices, hazard lamps and direction indicators. The fuel cell auxiliary machinery includes, for example, the compressor 130, the circulation pump 127, various valves including the flow-dividing valve 144 and the back pressure valve 143, a cooling medium pump configured to circulate the cooling medium and a radiator fan configured to cool down the cooling medium. In the case where the secondary battery 172 has a low state of charge (SOC), the secondary battery 172 may be part of the load. The fuel vehicle 20 of this embodiment determines a load request as the total of the required electric powers of the respective loads described above and changes the operation mode between the ordinary operation mode and the intermittent operation mode based on whether the load request is equal to or lower than the predefined reference value.

(B-1) Ordinary Operation Mode

Figure 2:
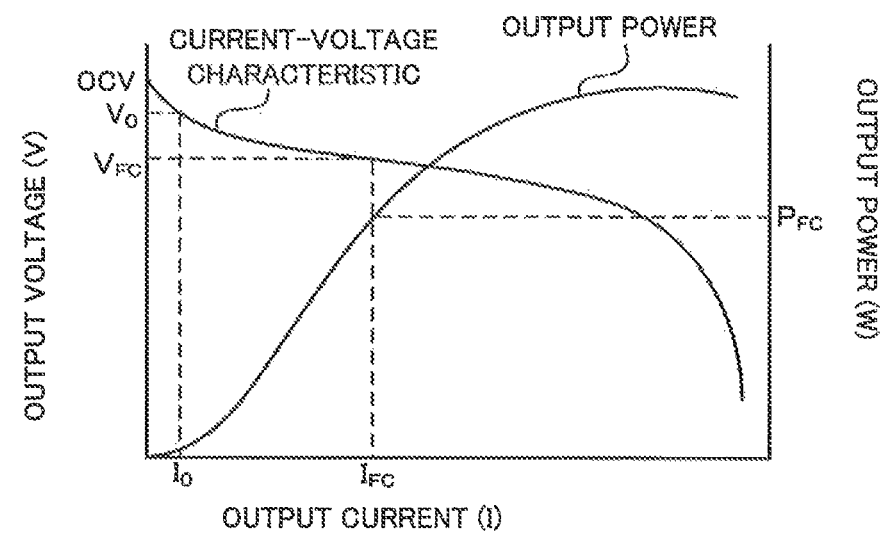
FIG. 2 is a diagram schematically illustrating relationships of output current to output voltage and output power of a fuel cell.

FIG. 2 is a diagram schematically illustrating relationships of output current to output voltage and output power of the fuel cell 100. The following describes control in the case of selection of the ordinary operation node.

According to this embodiment, the amount of power generation of the fuel cell 100 in the ordinary operation mode is controlled by setting the output voltage of the fuel cell 100. As understood from the relationship between the output current and the output power shown in FIG. 2, determining an electric power $P_{FC}$ to be output from the fuel cell 100 results in determining an output current $I_{FC}$ of the fuel cell 100. As shown by a current-voltage characteristic (I-V characteristic) in FIG. 2, determining the output current $I_{FC}$ of the fuel cell 100 results in determining an output voltage $V_{FC}$ of the fuel cell 100. At the time of selection of the ordinary operation mode, the controller 200 gives an instruction to set the determined output voltage $V_{FC}$ as a target voltage to the DC/DC converter 174, so as to control the amount of power generation of the fuel cell 100 to a desired level. At the time of selection of the ordinary operation mode, the amount of oxygen and the amount of hydrogen supplied to the fuel cell 100 are controlled to excess amounts that respectively exceed theoretical amounts required to obtain the desired electric power from the fuel cell 100.

(B-2) Non-Power Generation Mode

The following describes the non-power generation mode as one intermittent operation mode. When the non-power generation mode is selected to stop power generation of the fuel cell 100, the output current of the fuel cell 100 is equal to 0. When the state of the fuel cell 100 is changed from the power generation state to the stop state, i.e., when the fuel cell 100 is disconnected from the load to have the output current equal to 0 while sufficient amounts of hydrogen and oxygen for power generation are supplied to the fuel cell 100, the fuel cell 100 has an extremely high open-circuit voltage (OCV) as shown in FIG. 2. This indicates a significant increase in electrode potential at the cathode of the fuel cell 100. As is known, the high electrode potential of the fuel cell 100 causes elution of a catalyst metal such as platinum included in the electrode and deteriorates the performance of the fuel cell 100. It is accordingly desirable to suppress an excessive increase in electrode potential of the fuel cell 100, in order to suppress deterioration of the performance of the fuel cell 100. At the time of selection of the non-power generation mode, the power supply system 30 of this embodiment regulates the amount of oxygen supplied to the cathode-side flow path 148 during stop of power generation of the fuel cell 100 and thereby controls the electrode potential at the cathode in a desired range.

Figure 3:
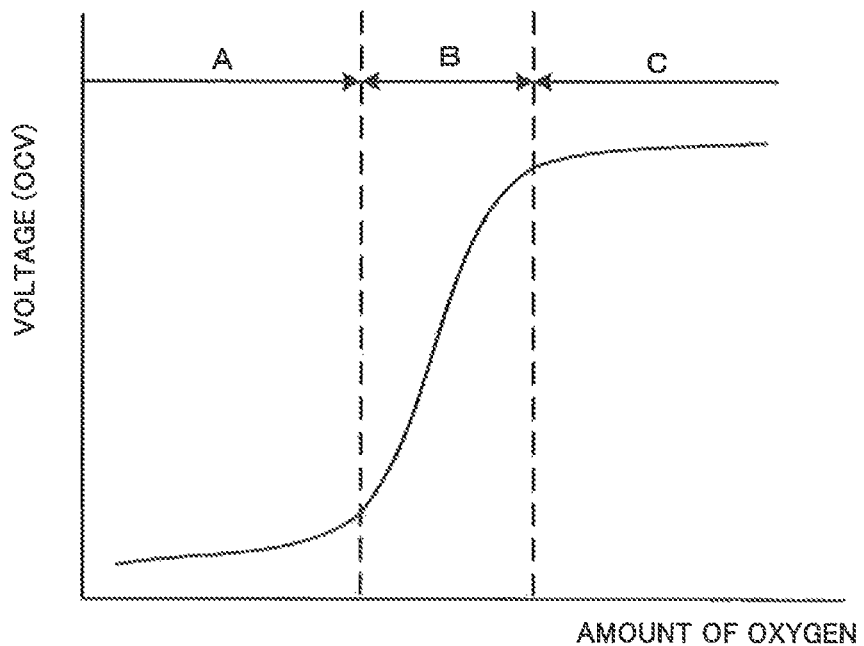
FIG. 3 is a diagram schematically illustrating a relationship between supply amount of oxygen and open-circuit voltage of the fuel cell.

FIG. 3 is a diagram schematically illustrating a relationship between supply amount of oxygen and open-circuit voltage (OCV) of the fuel cell 100 during stop of power generation of the fuel cell 100. FIG. 3 shows the relationship when the amount of oxygen supplied to the cathode-side flow path 148 is changed while a sufficient amount of hydrogen for power generation in the ordinary operation mode is supplied to the anode-side flow path 115. In the case where an extremely small amount of oxygen is supplied to the cathode-side flow path 148, the OCV is substantially kept at extremely low level and is not significantly changed with a change in supply amount of oxygen. In the diagram of FIG. 3, this range of the supply amount of oxygen is shown by an arrow A as an oxygen deficiency area A. When the supply amount of oxygen is increased, the OCV drastically increases with an increase in supply amount of oxygen. In the diagram of FIG. 3, this range of the supply amount of oxygen is shown by an arrow B as an equivalent ratio-of-approximately-1 area B. When the supply amount of oxygen is further increased, the OCV is substantially kept at extremely high level and is not significantly changed with a change in supply amount of oxygen. In the diagram of FIG. 3, this range of the supply amount of oxygen is shown by an arrow C as an excess oxygen area C. According to this embodiment, at the time of selection of the non-power generation mode, the supply amount of oxygen is controlled, such that the OCV is equal to a specified voltage in the equivalent ratio-of-approximately-1 area B. In other words, according to this embodiment, at the time of selection of the non-power generation mode, a specified voltage in the equivalent ratio-of-approximately-1 area B is set in advance as a target voltage of OCV, and the amount of oxygen supplied to the fuel cell 100 is regulated to make the open-circuit voltage of the fuel cell 100 equal to the target voltage.

In the air supply system 140 of the embodiment, the amount of the air (amount of oxygen) supplied to the cathode-side flow path 148 of the fuel cell 100 is determined according to the driving amount of the compressor 130, the valve-opening position of the flow-dividing valve 144 and the valve-opening position of the back pressure valve 143 as described above. According to this embodiment, at the time of selection of the non-power generation mode, the open-circuit voltage of the fuel cell 100 is controlled to the target voltage by changing the valve-opening position of the back pressure valve 143 while fixing the driving amount of the compressor 130 and the valve-opening position of the flow-dividing valve 144 among these parameters. According to this embodiment, a target voltage and an initial value of the valve-opening position of the back pressure valve 143 (i.e., initial value of the driving amount of the back pressure valve 143) for supplying an amount of oxygen that obtains the target voltage to the fuel cell 100 are stored in advance in a memory of the controller 200 in case of selection of the non-power generation mode. The valve-opening position of the back pressure valve 143 to obtain the target voltage may be determined in advance, for example, by experiment.

After stop of power generation of the fuel cell 100, hydrogen is transmitted from the anode-side flow path 115 to the cathode-side flow path 148 across the electrolyte membrane in each unit cell, and the oxidation reaction of the transmitted hydrogen proceeds at the cathode. As a result, oxygen in the cathode-side flow path 148 is consumed by the oxidation reaction of the hydrogen transmitted through the electrolyte membrane. In order to obtain a desired open-circuit voltage in the equivalent ratio-of-approximately-1 area in the fuel cell 100 during stop of power generation, there is a need to supply the amount of oxygen that is to be consumed by the oxidation reaction of the transmitted hydrogen (amount of oxygen consumed by transmitted hydrogen) in addition to the amount of oxygen determined corresponding to the desired open-circuit voltage from FIG. 3 (amount of oxygen required for electromotive force). Accordingly, the amount of oxygen that is to be supplied to the fuel cell 100 in order to obtain a desired open-circuit voltage at the time of selection of the non-power generation mode (amount of oxygen for maintaining cell voltage) is expressed by Equation (1) given below:

(amount of oxygen for maintaining cell voltage)=
(amount of oxygen required for electromotive force)+(amount of oxygen consumed by transmitted hydrogen)     (1)

When the amount of oxygen supplied to the fuel cell 100 just satisfies Equation (1) given above in the case where the valve-opening position of the back pressure valve 143 is adjusted to the valve-opening position stored in the memory of the controller 200, the open-circuit voltage of the fuel cell 100 becomes equal to the target voltage. The amount of hydrogen transmitted through the electrolyte membrane is, however, varied according to the pressure of hydrogen in the anode-side flow path 115, the internal temperature of the fuel cell 100 and the internal humidity of the fuel cell 100. When the supply amount of oxygen is insufficient due to these factors, the open-circuit voltage of the fuel cell 100 becomes lower than the target voltage. When the supply amount of oxygen is excessive, on the other hand, the open-circuit voltage of the fuel cell 100 becomes higher than the target voltage. The power supply system 30 of this embodiment performs control to vary the supply amount of oxygen to the fuel cell 100 based on the result of comparison between the detection value of the open-circuit voltage of the fuel cell 100 and the target voltage, so as to make the open-circuit voltage of the fuel cell 100 approach the target voltage. The details of this control will be described later.

In the non-power generation mode, the specified target voltage is set as described above. The target voltage may, however, be changed in the middle of the non-power generation mode that is continuously selected. For example, the target voltage may be set to a higher value when there is a high likelihood that the load quickly provides a load request, compared with the value of target voltage when there is a lower likelihood that the load quickly provides a load request. When there is a high likelihood that the load quickly provides a load request, a higher value is set to the target voltage, in order to provide a relatively large amount of oxygen in the cathode-side flow path 148 and thereby ensure the response to a subsequent increase of the load request. When there is a lower likelihood that the load quickly provides a load request, on the other hand, a lower value is set to the target voltage, in order to suppress an increase in voltage to an unacceptable level in each unit cell even when there is an increased variation in voltage among the respective unit cells of the fuel cell 100. This results in improving the durability of the entire fuel cell 100.

"There is a high likelihood that the load quickly provides a load request", for example, at the shift position set to D range. "There is a lower likelihood that the load quickly provides a load request", for example, at the shift position set to P range. Even at the shift position set to D range, it may be determined that "there is a lower likelihood that the load quickly provides a load request", when an elapsed time since satisfaction of conditions that "the shift position is D range" and that "a low load request is provided corresponding to the intermittent operation mode" exceeds a predetermined reference time.

Even at the time of selection of the intermittent operation mode (non-power generation mode or the low power generation mode described later), the anode-side flow path 115 in the fuel cell 100 is maintained in the state that is in the presence of an amount of hydrogen which enables electric power exceeding the load request as the basis for selection of the intermittent operation mode to be generated immediately. In other words, even at the time of selection of the intermittent operation mode, the circulation pump 127 is continuously driven, while hydrogen is supplied from the hydrogen supply device 126 in order to compensate for the lost hydrogen that is transmitted through the electrolyte membrane to the cathode-side flow path 148.

The target voltage of OCV of the fuel cell 100 (average cell voltage) set at the time of selection of the non-power generation mode is preferably not higher than 0.9 V, is more preferably not higher than 0.85V and is furthermore preferably not higher than 0.8 V, in terms of suppressing deterioration (elution) of the electrode catalyst caused by the high potential.

The lower cell voltage at the cathode or, in other words, the lower oxygen partial pressure in the cathode-side flow path 148, is expected to facilitate reduction of the electrode catalyst at the cathode (i.e., is more likely to eliminate the oxide film on the surface of the catalyst). Reducing the electrode catalyst at the cathode may cause a problem that elution of the electrode catalyst at the cathode is more likely to proceed with a subsequent increase in potential by a subsequent supply of oxygen into the cathode-side flow path 148. Accordingly, at the time of selection of the non-power generation mode, it is desirable that the cell voltage does not decrease to 0 V in any of the unit cells of the fuel cell 100. Accordingly, in terms of suppressing this problem caused by a decrease in cell voltage, the target voltage of OCV (average cell voltage) set at the time of selection of the non-power generation mode is preferably not lower than 0.1 V and is more preferably not lower than 0.2 V.

During continuation of the non-power generation mode, it is likely to increase a variation in open-circuit voltage among the respective unit cells. Even in such a case, it is desirable that the voltages of all the unit cells are in a voltage range that sufficiently suppresses elution of the electrode catalyst. Even in the case of selection of the non-power generation mode, over a long time period, in order to suppress an excessive increase of OCV in each unit cell, for example, "when there is a lower likelihood that the load quickly provides a load request" as described above, the target voltage of OCV (average cell voltage) set at the time of selection of the non-power generation mode is preferably not higher than 0.4 V and is more preferably not higher than 0.3 V.

At the time of selection of the non-power generation mode, the load request is equal to or lower than the predefined reference value. The power supply system 30 is, however, in operation (with no input of the user's instruction to stop the system), so that the load request is likely to increase in a short time period. It is accordingly desirable not to excessively decrease the amount of oxygen in the cathode-side flow path 148, in terms of obtaining a desired electric power quickly in response to a subsequent increase in load request. In other words, in terms of ensuring the response to a subsequent increase in load request, it is desirable to set a higher value to the target voltage of OCV (average cell voltage) at the time of selection of the non-power generation mode. For example, "when there is a high likelihood that the load quickly provides a load request" as described above, the target voltage is preferably not lower than 0.6 V and is more preferably not lower than 0.7 V in order to ensure the response to the load request.

When the non-power generation mode is selected as the intermittent operation mode as described above, in a low load state that the load request is equal to or lower than the predefined reference value, the power supply system 30 can avoid the high potential state of the fuel cell 100 without power generation of the fuel cell 100. There is accordingly no need to start unrequired, excessive power generation for only the purpose of avoiding the high potential state. This also suppresses the energy efficiency of the power supply system 30 from being decreased due to, for example, storage of the excessively generated electric power into the secondary battery 172.

(B-3) Low Power Generation Mode

The following describes the low power generation mode as another intermittent operation mode. Like the ordinary operation mode, the low power generation mode is an operation mode accompanied with power generation of the fuel cell 100. Unlike the ordinary operation mode that supplies an excess amount of oxygen to the fuel cell 100, however, the low power generation mode is an operation mode that supplies just a required amount of oxygen, which is theoretically determined from a target amount of power generation of the fuel cell 100, to the fuel cell 100.

Figure 4:
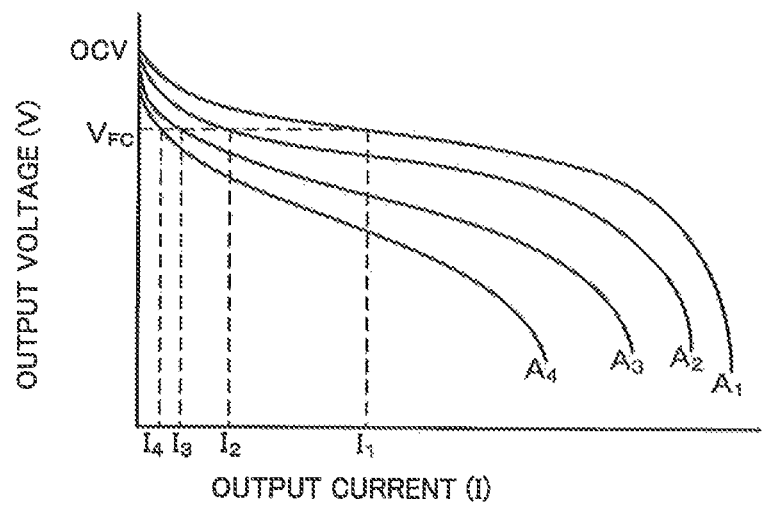
FIG. 4 is a diagram showing IV characteristics of the fuel cell when the supply amount of oxygen is changed while an excess amount of hydrogen is supplied to the fuel cell.

FIG. 4 is a diagram schematically showing IV characteristics of the fuel cell 100 when the amount of oxygen supplied to the fuel cell 100 is changed while an excess amount of hydrogen is supplied to the fuel cell 100. FIG. 4 includes four graphs $A_1$ to $A_4$ that respectively show IV characteristics of the fuel cell 100. The supply amount of oxygen decreases in the sequence of $A_1$, $A_2$, $A_3$ and $A_4$. The graph $A_1$ shows the IV characteristic in the ordinary operation mode that supplies an excess amount of oxygen. As understood from FIG. 4, at a specified output voltage ($V_{FC}$), output current decreases ($I_1$ to $I_4$) with a decrease in amount of oxygen supplied to the fuel cell 100 and results in decreasing the output power.

Figure 5:
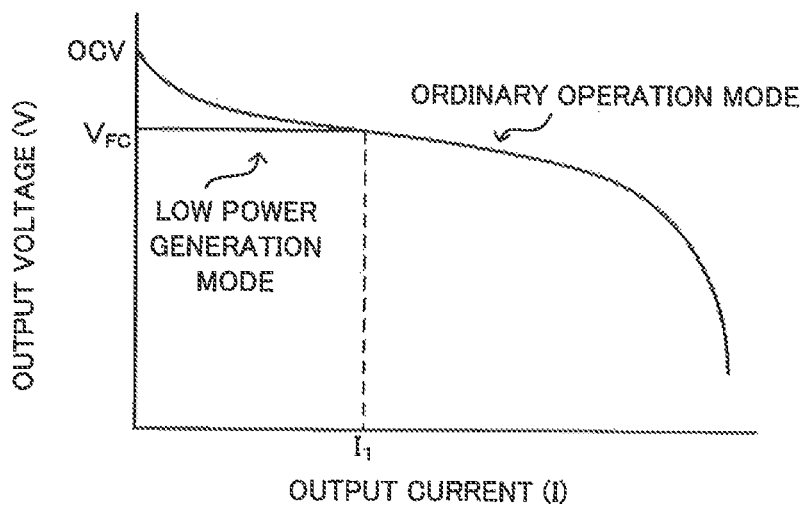
FIG. 5 is a diagram showing an available range of operation point at the time of selection of a low power generation mode, along with an IV characteristic in an ordinary operation mode.

FIG. 5 is a diagram showing an available range of operation point of the fuel cell 100 at the time of selection of the low power generation mode, along with the IV characteristic in the ordinary operation mode. At the time of selection of the ordinary operation mode, setting the output voltage of the fuel cell 100 to a specified output voltage ($V_{FC}$) provides an output current L. At the time of selection of the low power generation mode, on the other hand, while the output voltage of the fuel cell 100 is set to the specified output voltage ($V_{FC}$), the supply amount of oxygen is changed. This sets the magnitude of the output current to a desired lower value than the output current $I_1$ described above and thereby controls the amount of power generation to a desired value. Accordingly, an available operation point of the fuel cell 100 at the time of selection of the low power generation mode may be set on a line segment in the range of the output current from 0 to $I_1$ at the output voltage of $V_{FC}$.

At the time of selection of the low power generation mode where the motor 170 does not require electric power, the total amount of the load request includes at least required electric power of the vehicle auxiliary machinery and the fuel cell auxiliary machinery. A target amount of power generation at the time of selection of the low power generation mode is set based on this load request. At the time of selection of the low power generation mode, there is no need that the entire amount of this load request is covered by the electric power generated by the fuel cell 100 (in other words, there is no need to set the target amount of power generation equal to or higher than the entire amount of this load request), but part of the load request may be output from the secondary battery 172. The entire amount of the load request may include an electric power that is used to charge the secondary battery 172. At the time of selection of the low power generation mode, the required electric power of the vehicle auxiliary machinery, the fuel cell auxiliary machinery and the secondary battery 172 is varied, so that the target amount of power generation of the fuel cell 100 may be changed with the variation in load. It is, however, desirable that the target amount of power generation at the time of selection of the low power generation mode does not exceed the total amount of the required electric power of the vehicle auxiliary machinery and the fuel cell auxiliary machinery and the required electric power of the secondary battery 172.

When the target amount of power generation of the fuel cell 100 is set equal to or lower than the total required electric power of the vehicle auxiliary machinery and the fuel cell auxiliary machinery, this suppresses an excess state of charge (SOC) of the secondary battery 172. When the target amount of power generation of the fuel cell 100 is set higher than the total required electric power of the vehicle auxiliary machinery and the fuel cell auxiliary machinery, on the other hand, this suppresses an excessive decrease in state of charge (SOC) of the secondary battery 172, while reducing the frequency of charging the secondary battery 172. During charging of the secondary battery 172, there is a likelihood that the driving amount of the compressor 130 increases to cause noise. Reducing the frequency of charging suppresses this potential problem. The target amount of power generation of the fuel cell 100 at the time of selection of the low power generation mode is thus adequately set according to, for example, the operating conditions and the load request of the fuel cell vehicle 20.

In the air supply system 140 of the embodiment, the amount of the air (amount of oxygen) supplied to the cathode-side flow path 148 of the fuel cell 100 is determined according to the driving amount of the compressor 130, the valve-opening position of the flow-dividing valve 144 and the valve-opening position of the back pressure valve 143 as described above. According to this embodiment, at the time of selection of the low power generation mode, the amount of power generation of the fuel cell 100 is controlled to the target amount of power generation by changing the driving amount of the compressor 130 and the valve-opening position of the back pressure valve 143 while fixing the valve-opening position of the flow-dividing valve 144 among these parameters. According to this embodiment, the valve-opening position of the back pressure valve 143 (i.e., driving amount of the back pressure valve 143) and the driving amount of the compressor 130 for supplying an amount of oxygen that achieves the target amount of power generation to the fuel cell 100 are set in advance over an entire available range of the target amount of power generation as initial values in the memory of the controller 200. The valve-opening position of the back pressure valve 143 and the driving amount of the compressor 130 to achieve the target amount of power generation may be determined in advance, for example, by experiment. At the time of selection of the low power generation mode, oxygen is consumed for power generation, so that the driving amount of compressor 130 is larger in the low power generation mode than that in the nonpower generation mode.

The target voltage of power generation of the fuel cell 100 (average cell voltage) set at the time of selection of the low power generation mode is preferably not higher than 0.9 V, is more preferably not higher than 0.85 V and is furthermore preferably not higher than 0.8 V, in terms of suppressing deterioration (elution) of the electrode catalyst caused by the high potential.

Figure 6:
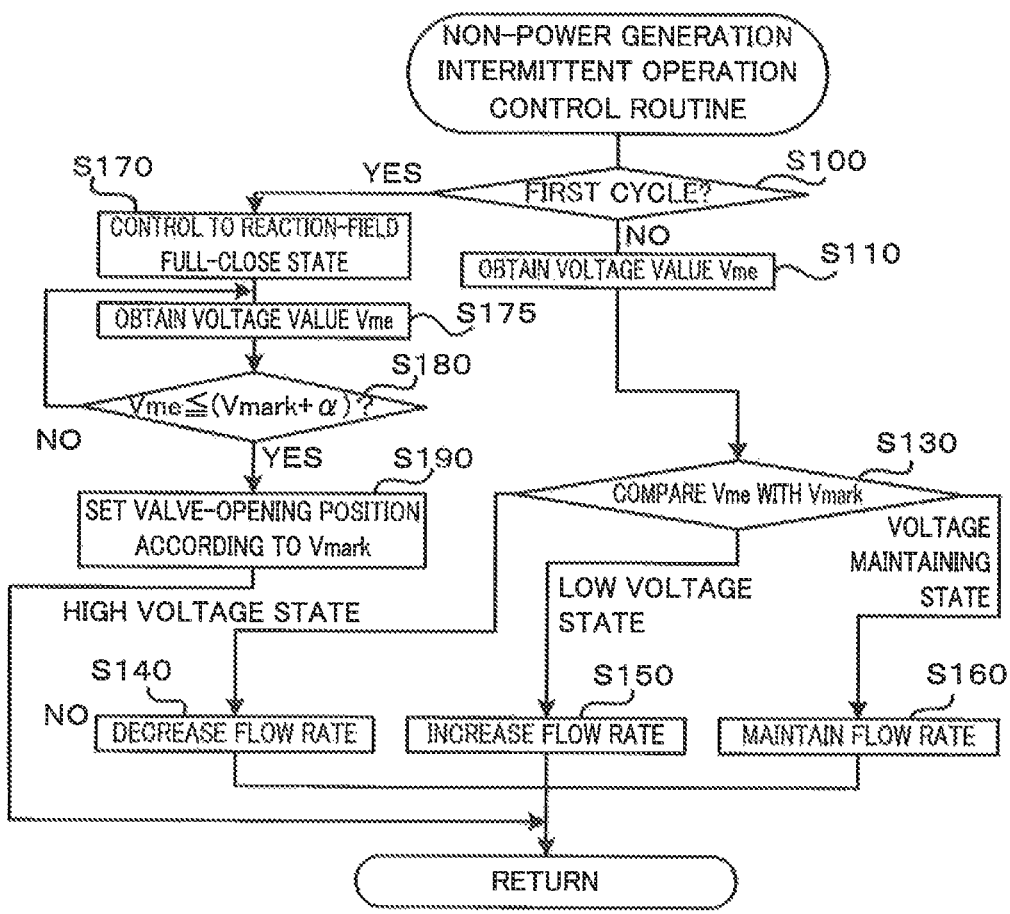
FIG. 6 is a flowchart showing a non-power generation intermittent operation control routine.

C. Control at Selection of Intermittent Operation Mode (C-1) Control at Selection of Non-Power Generation Mode FIG. 6 is a flowchart showing a non-power generation intermittent operation control routine performed by the CPU of the controller 200 as a series of operations at the time of selection of the non-power generation triode. This routine is triggered by selection of the non-power generation mode and is repeatedly performed until release of the non-power generation mode. The non-power generation mode may be released, for example, in response to a load request from a main load (motor 170) (steps S330 and S340 in FIG. 8 described later). An operation for selecting the non-power generation mode will be described later in detail. The interval at which this routine is repeatedly performed is set to a longer time duration (for example, 1 to 5 seconds) than a time duration required between a change in valve-opening position of the back pressure valve 143 in this routine and a resulting actual change in amount of oxygen supplied to the cathode-side flow path 148.

On start of this routine, the CPU first determines whether a current cycle of the non-power generation intermittent operation control routine is a first cycle after a change of the operation mode of the power supply system 30 to the intermittent operation mode this time (step S100). When it is determined that the current cycle is the first cycle after a change to the intermittent operation mode this time, the CPU controls the back pressure valve 143 to a reaction field full-close state (step S170) and obtains a voltage value Vme of the fuel cell 100 from the voltage sensor 102 (step S175).

The reaction-field full-close state herein means a valve-opening position of the back pressure valve 143 that supplies the amount of oxygen at a boundary between the oxygen deficiency area A and the equivalent ratio-of-approximately-1 area B shown in FIG. 3. In other words, the reaction-field full-close state denotes a valve-opening position of the back pressure valve 143 that supplies an amount of oxygen which is required for oxidation of hydrogen transmitted through the electrolyte membrane during stop of power generation of the fuel cell 100, to the fuel cell 100. Controlling the back pressure valve 143 to the reaction-field full-close state at step S170 drastically decreases the amount of oxygen that is supplied to the fuel cell 100, compared with the amount of oxygen at the time of selection of the ordinary operation mode. According to this embodiment, a valve-opening position of the back pressure valve 143 that provides the reaction-field full-close state is set in advance and stored in the memory of the controller 200.

In the case where the timing when it is determined at step S100 that the current cycle is the first cycle after a change to the intermittent operation mode this time is the timing of a switch from "the state that the fuel cell 100 generates electric power in response to a load request" to the "non-power generation mode", an excess amount of oxygen is supplied to the fuel cell 100 at the timing of this switch. Stopping power generation of the fuel cell 100 immediately after step S170 is thus likely to increase the OCV of the fuel cell 100 to an unacceptable level. Power generation of the fuel cell 100 may thus be continued even after step S170, for example, in the state that the output voltage of the fuel cell 100 is equal to or lower than an allowable upper limit. In the case where power generation of the fuel cell 100 is continued after step S170, the amount of oxygen in the cathode-side flow path 148 in the fuel cell 100 is consumed by power generation and drastically decreases. This leads to a gradual decrease in output current of the fuel cell 100. When the output current of the fuel cell 100 decreases to a certain level, the diode included in the DC/DC converter 104 works to shut off the power supply from the fuel cell 100 to the load and thereby stop power generation of the fuel cell 100.

In the case where power generation of the fuel cell 100 is stopped after step S170, on the other hand, the amount of oxygen in the cathode-side flow path 148 in the fuel cell 100 is rapidly decreased by oxidation of hydrogen transmitted through the electrolyte membrane on the cathode. Decreasing the amount of oxygen in the fuel cell 100 causes the OCV of the fuel cell 100 after stop of power generation to be decreased and approach the allowable upper limit. Further continuation of stop of power generation of the fuel cell 100 causes the OCV of the fuel cell 100 to be decreased to or below this allowable upper limit.

At step S175, the CPU obtains the output voltage of the fuel cell 100 during power generation of the fuel cell 100, while obtaining the OCV of the fuel cell 100 during stop of power generation of the fuel cell 100. According to this embodiment, the voltage value Vme denotes an average cell voltage calculated by dividing the voltage value of the entire cell stack detected by the voltage sensor 102 by the number of cells included in the cell stack.

After obtaining the voltage value Vme of the fuel cell 100 at step S175, the CPU compares the obtained voltage value Vme with a target voltage Vmark +α (step S180). The target voltage Vmark herein denotes a target voltage at the time of selection of the non-power generation mode that is stored in advance in the memory of the controller 200, and α denotes a positive value provided to suppress the OCV of the fuel cell 100 from decreasing to below the target voltage Vmark due to a delay in increase of the supply amount of oxygen to the cathode-side flow path 148. As described above, the voltage value Vme gradually decreases after stop of power generation of the fuel cell 100. According to this embodiment, the CPU repeats input of the voltage value Vme at step S175 and determination at step S180 until the voltage value Vme becomes equal to or lower than the target voltage Vmark +α.

When it is determined at step S180 that the voltage value Vme becomes equal to or lower than the target voltage Vmark +α, the CPU outputs a driving signal to the stepping motor of the back pressure valve 143 in order to control the valve-opening position of the back pressure valve 143 to a valve-opening position stored in advance to achieve the target voltage Vmark (step S190) and terminates this routine. This increases the amount of oxygen supplied to the fuel cell 100 from the amount of oxygen corresponding to the reaction-field full-close state to the amount of oxygen corresponding to the valve-opening position of the back pressure valve 143 that achieves the target voltage Vmark.

When the supply amount of oxygen is increased after a drop of the voltage value Vme to the target voltage Vmark, the voltage of the fuel cell 100 is likely to further decrease to below the target voltage Vmark until a desired amount of oxygen reaches the cathode. According to this embodiment, the supply amount of oxygen is increased at the timing when the voltage value Vme becomes equal to or lower than the target voltage Vmark +α. This suppresses the voltage of the fuel cell 100 from decreasing to below the target voltage Vmark. The value a may be set adequately by taking into account the response of driving the bank pressure valve 143 and the time duration when oxygen actually reaches the cathode after an increase in supply amount (this is affected by, for example, the flow path resistance and the flow path length of the flow path including the cathode-side flow path 148).

When it is determined at step S100 that the current cycle of the non-power generation intermittent operation control routine is not the first cycle after a change to the intermittent operation mode this time, i.e., when it is determined that control of the valve-opening position of the back pressure valve 143 has already been started, the CPU obtains the voltage value Vme of the fuel cell 100 from the voltage sensor 102 (step S110). Since power generation of the fuel cell 100 has already been stopped, at step S110, the CPU obtains the OCV of the fuel cell 100 as the voltage value Vme.

After obtaining the voltage value Vme at step S110, the CPU compares the obtained voltage value Vme with the target voltage Vmark (step S130). When the result of comparison shows that the obtained voltage value Vme is higher than the target voltage Vmark by at least a first value (hereinafter this state is referred to as high voltage state), the CPU reduces the valve opening of the back pressure valve 143 in the non-power generation state to decrease the flow rate of oxygen supplied to the cathode-side flow path 148 (step S140) and then terminates this routine. When the result of comparison shows that the obtained voltage value Vme is lower than the target voltage Vmark by at least a second value (hereinafter this state is referred to as low voltage state), the CPU increases the valve opening of the back pressure valve 143 in the non-power generation state to increase the flow rate of oxygen supplied to the cathode-side flow path 148 (step S150) and then terminates this routine. When the result of comparison shows neither the high voltage state nor the low voltage state (but corresponds to a voltage maintaining state), the CPU maintains the current valve opening position of the back pressure valve 143 in the non-power generation state to keep the amount of oxygen supplied to the cathode-side flow path 148 (step S160) and then terminates this routine.

According to this embodiment, in the case of decreasing the valve-opening position of the back pressure valve 143 at step S140 or in the case of increasing the valve-opening position of the back pressure valve 143 at step S150, the driving amount of the stepping motor of the back pressure valve 143 is varied to change the valve-opening position by one step. In other words, the valve-opening position of the back pressure valve 143 is changed by the minimum unit of changing the valve-opening position. This suppresses a drastic voltage variation of the fuel cell 100. The amount of each change in valve-opening position of the back pressure valve 143 may however, be set to two or more steps.

The first value used for the determination to decrease the amount of oxygen at step S140 may be different or may be identical with the second value used for the determination to increase the amount of oxygen at step S150. The first value and the second value may be set arbitrarily to positive values by taking into account, for example, the response of changing the flow rate of oxygen to the driving signal input to the back pressure valve 143.

(C-2) Control at Selection of Low Power Generation Mode

Figure 7:
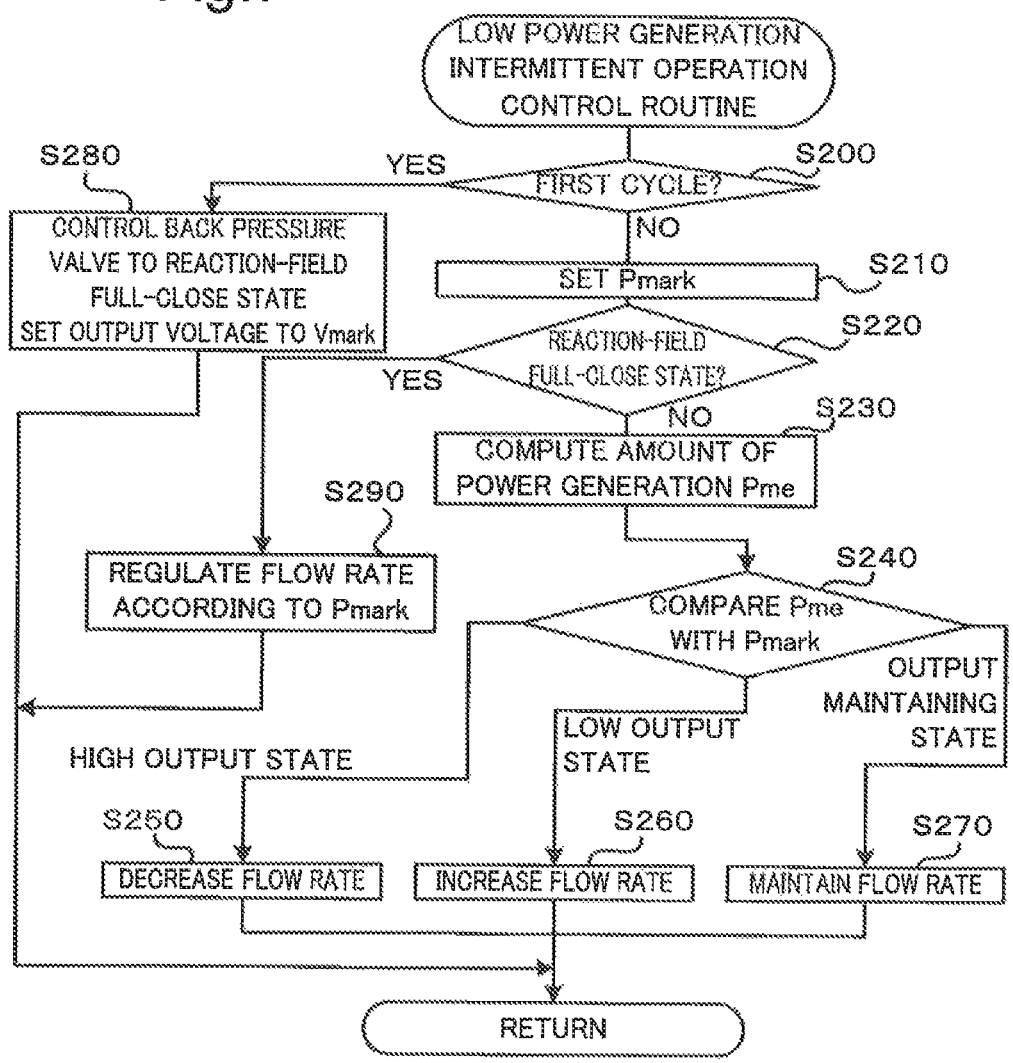
FIG. 7 is a flowchart showing a low power generation intermittent operation control routine.

FIG. 7 is a flowchart showing a low power generation intermittent operation control routine performed by the CPU of the controller 200 as a series of operations at the time of selection of the low power generation mode. This routine is triggered by selection of the low power generation mode and is repeatedly performed until release of the low power generation mode. The low power generation mode may be released, for example, in response to a load request from the main load (motor 170) (steps S380 and S390 in FIG. 8 described later). An operation for selecting the low power generation mode will be described later in detail. The interval at which this routine is repeatedly performed is set to a longer time duration (for example, 20 to 30 seconds) than the time duration required between a change in valve-opening position of the back pressure valve 143 in this routine and a resulting actual change in amount of oxygen supplied to the cathode-side flow path 148.

On start of this routine, the CPU first determines whether a current cycle of the low power generation intermittent operation control routine is a first cycle after selection of the low power generation mode (step S200). When it is determined that the current cycle is the first cycle after selection of the low power generation mode, the CPU controls the back pressure valve 143 to the reaction-field full-close state described above and sets the output voltage of the fuel cell 100 to the target voltage Vmark (step S280) and terminates this routine. Accordingly, the CPU gives an instruction with setting the initial value of target voltage stored in advance in the memory to the target voltage Vmark, to the DC/DC converter 174.

Controlling the back pressure valve 143 to the reaction-field full-close state at step S280 drastically decreases the supply of oxygen to the cathode-side fuel path 148 in the fuel cell 100. Continuation of power generation of the fuel cell 100 in the state that the supply of oxygen to the cathode-side flow path 148 is drastically decreased causes the amount of oxygen in the cathode-side flow path 148 to be decreased accompanied with power generation. In this state, the output voltage of the fuel cell 100 is fixed to the target voltage Vmark, so that the output current and the output power of the fuel cell 100 gradually decrease with a decrease in amount of oxygen. As shown in FIG. 5, the available operation point of the fuel cell 100 at the time of selection of the low power generation mode may be set on the line segment in the range of the output current from 0 to $I_1$ at the output voltage of $V_{FC}$ (target voltage Vmark). Accordingly, decreasing the supply of oxygen to the cathode-side flow path 148 shifts the operation point of the fuel cell 100 along this line segment in a direction of decreasing the output current from the point of the output current $I_1$. The electric power generated by the fuel cell 100 in this state may be consumed by the fuel cell auxiliary machinery and the vehicle auxiliary machinery. An additional amount of electric power generated may be used to charge the secondary battery 172.

When it is determined at step S200 that the current cycle of the low power generation intermittent operation control routine is not the first cycle after selection of the low power generation mode, on the other hand, the CPU sets a target amount of power generation Pmark of the fuel cell 100 (step S210). The target amount of power generation Pmark may be set, based on the required electric power of the vehicle auxiliary machinery, the fuel cell auxiliary machinery and the secondary battery 172 as described above.

After setting the target amount of power generation Pmark at step S210, the CPU determines whether the back pressure valve 143 is in the reaction-field full-close state (step S220). It is determined at step S220 that the back pressure valve 143 in the reaction-field full-close state, immediately after the low power generation intermittent operation control routine has been started to control the back pressure valve 143 to the reaction-field full-close state at step S280 but before control of the amount of oxygen supplied to the cathode-side flow path 148 has not yet been started.

When it is determined at step S220 that the back pressure valve 143 is in the reaction-field full-close state, the CPU adjusts the supply amount of oxygen in order to supply an amount of oxygen required to achieve the target amount of power generation Pmark to the cathode-side flow path 148 (step S290) and terminates this routine. As described above, according to this embodiment, the valve-opening position of the back pressure valve 143 (driving amount of the back pressure valve 143) and the driving amount of the compressor 130 for supplying an amount of oxygen that achieves the target amount of power generation to the fuel cell 100 over the entire available range of the target voltage Vmark at the time of selection of the low power generation mode are stored in advance in the form of a map in the memory of the controller 200. At step S290, the CPU refers to this map and adjusts the supply amount of oxygen according to the target amount of power generation Pmark.

When it is determined at step S220 that the back pressure valve 143 is not in the reaction-field full-close state, i.e., when control of the supply amount of oxygen has already been started, the CPU computes a current amount of power generation Pme of the fuel cell 100 (step S230). The amount of power generation Pme of the fuel cell 100 may be calculated from an output voltage Vme detected by the voltage sensor 102 and an output current Ime detected by the current sensor 103.

After computing the amount of power generation Pme at step S230, the CPU compares the computed amount of power generation with the target amount of power generation Pmark (step S240). When the result of comparison shows that the computed amount of power generation Pme is higher than the target amount of power generation Pmark by at least a first value (hereinafter this state is referred to as high output state), the CPU performs control to decrease the amount of oxygen supplied to the cathode-side flow path 148 (step S250) and then terminates this routine. When the result of comparison shows that the computed amount of power generation Pme is lower than the target amount of power generation Pmark by at least a second value (hereinafter this state is referred to as low output state), the CPU performs control to increase the amount of oxygen supplied to the cathode-side flow path 148 (step S260) and then terminates this routine. When the result of comparison shows neither the high output state nor the low output state (but corresponds to an output maintaining state), the CPU maintains the amount of oxygen supplied to the cathode-side flow path 148 (step S270) and then terminates this routine.

According to this embodiment, the supply amount of oxygen is controlled to increase or decrease by changing the driving amount of the compressor 130 and the valve-opening position of the back pressure valve 143 while fixing the valve-opening position of the flow-dividing valve 144 as described above. More specifically the supply amount of oxygen is roughly regulated by changing the driving amount of the compressor 130 and is finely adjusted by changing the valve-opening position of the back pressure valve 143. For example, when there is a small difference between the amount of power generation Pme and the target amount of power generation Pmark, only the valve-opening position of the back pressure valve 143 may be changed. In this case, the amount of increasing or decreasing the valve opening of the back pressure valve 143 may be fixed (for example, varied by one step) or may be changed such that the valve-opening position of the back pressure valve 143 is increased or decreased by a greater degree with an increase in difference between the amount of power generation Pme and the target amount of power generation Pmark. For example, when a load request is varied to increase the difference between the amount of power generation Pme and the target amount of power generation Pmark, the driving amount of the compressor 130 may be changed, in place of or in addition to changing the valve-opening position of the back pressure valve 143. Combination of changing the driving amount of the compressor 130 with changing the valve-opening position of the back pressure valve 143 suppresses a variation in driving amount of the compressor 130. This accordingly suppresses the noise due to the variation in rotation speed of the compressor 130.

The first value used for the determination to decrease the amount of oxygen at step S250 may be different or may be identical with the second value used for the determination to increase the amount of oxygen at step S260. The first value and the second value may be set arbitrarily to positive values by taking into account, for example, the response of changing the flow rate of oxygen to the driving signals input to the back pressure valve 143 and the compressor 130.

D. Switch Control of Intermittent Operation Mode

Figure 8:
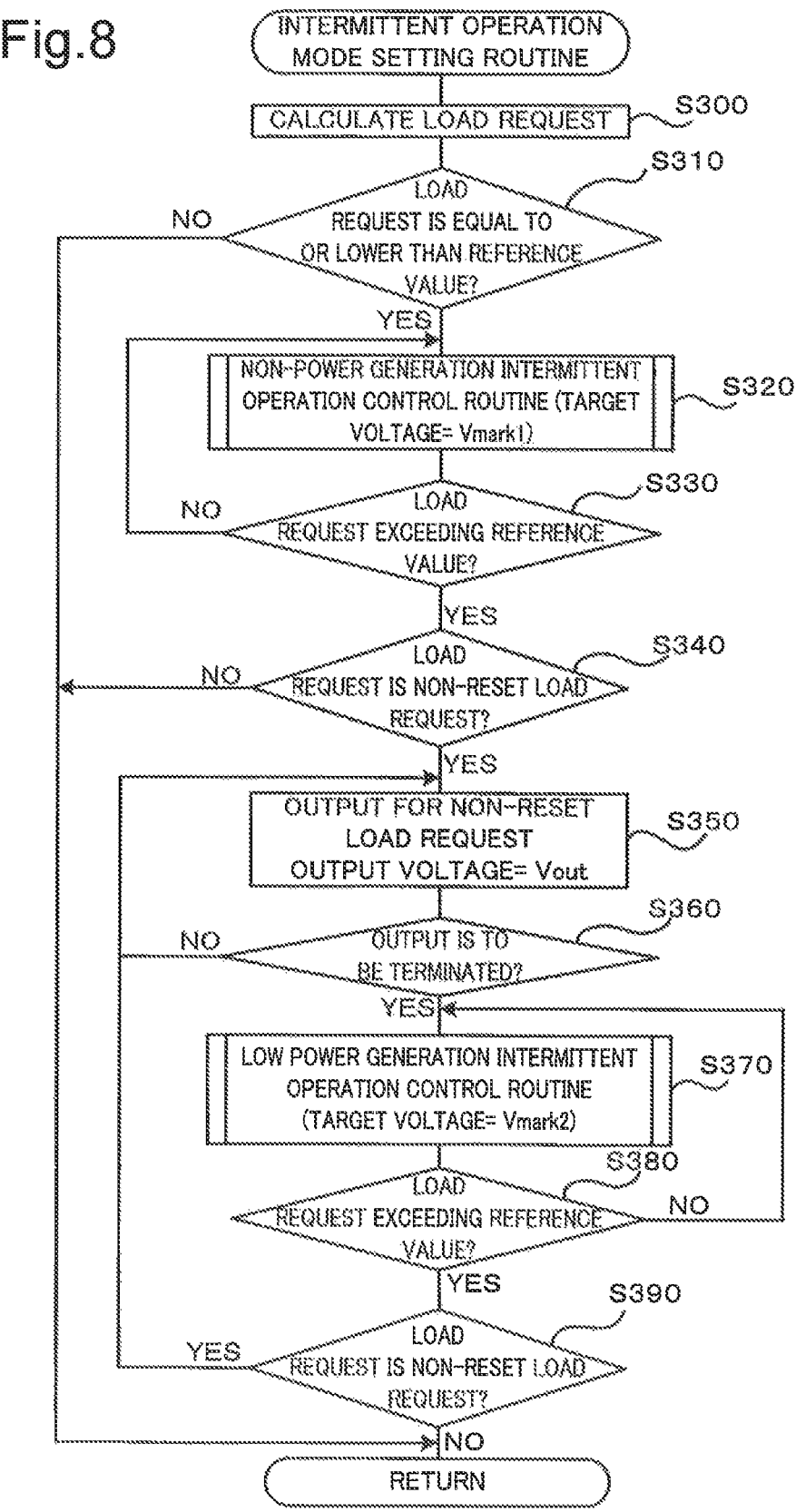
FIG. 8 is a flowchart showing an intermittent operation mode setting routine.

FIG. 8 is a flowchart showing an intermittent operation mode setting routine performed by the CPU of the controller 200 as a series of operations involved in setting the intermittent operation mode. This routine is triggered by activation of the power supply system 30 and is repeatedly performed during operation of the power supply system 30 until input of the user's instruction to stop the system. The power supply system 30 selects either the non-power generation mode or the low power generation mode as the intermittent operation mode as described above. The power supply system 30 of the embodiment generally selects the non-power generation mode at the time of selection of the intermittent operation mode and selects the low power generation mode to suppress a variation in voltage when there is a specified load request in selection of the intermittent operation mode as described below.

On start of this routine, the CPU calculates a load request (step S300). The load request denotes the total amount of the required electric power of the motor 170 and the required electric power of the vehicle auxiliary machinery and the fuel cell auxiliary machinery as described above. The required electric power of the motor 170 may be determined, based on the detection signals of the accelerator position sensor 180 and the vehicle speed sensor. The required electric power of the vehicle auxiliary machinery and the fuel cell auxiliary machinery is determined, based on the driving signals output to the respective auxiliary machines.

The CPU subsequently determines whether the calculated load request is equal to or lower than a predefined reference value (step S310). When it is determined that the load request is higher than the predefined reference value, the power supply system 30 does not select the intermittent operation mode, so that the CPU immediately terminates this routine. In this case, the CPU performs control in the ordinary operation mode, based on the load request.

When it is determined at step S310 that the load request is equal to or lower than the reference value, the CPU performs the non-power generation intermittent operation control routine of FIG. 6 (step S320). In the non-power generation intermittent operation control routine at step S320, the target voltage of the fuel cell 100 is set to a target voltage Vmark1. The state of the load request that causes the non-power generation intermittent operation control routine to be performed at step S320 according to this embodiment corresponds to the "first low load state" SUMMARY. The target voltage Vmark1 corresponds to the "first target voltage" in SUMMARY.

In each cycle of the non-power generation intermittent operation control routine at step S320, the CRU determines whether there is a load request exceeding the reference value used at the determination of step S310 (step S330). The CPU repeats the non-power generation intermittent operation control routine at step S320 until determination that there is a load request exceeding the reference value at step S330.

When it is determined at step S330 that there is a load request exceeding the reference value, the CPU determines whether the load request as the object of the determination corresponds to a non-reset load request (step S340). According to this embodiment, the load request exceeding the reference value is divided into a reset load request that is to release the intermittent operation mode (i.e., to terminate the intermittent operation mode setting routine of FIG. 8) and a non-reset load request that does not release the intermittent operation mode. According to this embodiment, a load request in the state that the secondary battery 172 has a low state of charge SOC (i.e., load request for charging the secondary battery 172) is specified as the non-reset load request. When it is determined at step S340 that the load request does not correspond to the non-reset load request but is a reset load request (for example, an accelerator-on time), the CPU terminates this routine.

When it is determined at step S340 that the load request corresponds to the non-reset load request, on the other hand, the CPU interrupts power generation in the intermittent operation mode and performs power generation control for the non-reset load request (step S350). In the case of power generation for the non-request load request, such as in the case of charging the secondary battery 172, the CPU performs power generation control of the fuel cell 100 such as to generate an electric power corresponding to the non-reset load request in the state that excess amounts of hydrogen and oxygen are supplied to the fuel cell 100 as in the ordinary operation mode. In this embodiment, the power generation control at step S350 sets the output voltage of the fuel cell 100 to Vout. According to this embodiment, the output voltage Vout is higher than the target voltage Vmark1 set in the non-power generation intermittent operation control routine at step S320.

After starting the power generation control at step S350, the CPU determines whether output from the fuel cell 100 responding to the non-request load request is to be terminated (step S360). More specifically, the CPU determines whether the SOC of the secondary battery 172 has been recovered and there is no need to further charge the secondary battery 172. The CPU continues the power generation control at step S350 until determination that the output responding to the non-request load request is to be terminated.

When it is determined at step S360 that the output responding to the non-request load request is to be terminated, the CPU changes the control to return to the intermittent operation mode and performs the low power generation intermittent operation control routine of FIG. 7 in the subsequent intermittent operation mode (step S370). In the low power generation intermittent operation control routine at step S370, the target voltage of the fuel cell 100 is set to a target voltage Vmark2 that is higher than the target voltage Vmark1 set at step S320. The state of the load request that causes the low power generation intermittent operation control routine to be performed at step S370 according to this embodiment corresponds to the "second low load state" in SUMMARY. The target voltage Vmark2 corresponds to the "second target voltage" in SUMMARY. It is preferable that the second target voltage Vmark2 set at step S370 is lower than the output voltage Vout set at step S350. This is attributable to the following reasons. In the case of changing the output voltage, decreasing the output voltage suppresses an increase in variation of the voltage among the respective unit cells, compared with increasing the output voltage. Even in the case where the low load state continues after starting the low power generation intermittent operation control routine at step S370 to increase a variation in voltage among the respective unit cells, this suppresses the voltage of each unit cell from increasing to an undesired level.

In each cycle of the low power generation intermittent operation control routine at step S370, the CPU determines whether there is a load request exceeding the reference value used at the determination of step S310 (step S380). The CPU repeats the low power generation intermittent operation control routine at step S370 until determination that there is a load request exceeding the reference value at step S380.

When it is determined at step S380 that there is a load request exceeding the reference value, the CPU determines whether the load request as the object of the determination corresponds to the non-reset load request (step S390). The processing of step S390 is similar to the processing of step S340 described above. When it is determined at step S390 that the load request corresponds to the non-reset load request, the CPU returns to step S350 and repeats the series of processing of step S350 and subsequent steps as described above. When it is determined at step S390 that the load request does not correspond to the non-reset load request but is a reset load request (for example, an accelerator-on time), on the other hand, the CPU terminates this routine. After determination that the load request is the reset load request at step S340 or at step S390, the CPU starts power generation in the ordinary operation mode in response to a load request from the motor 170.

In the power supply system 30 of the embodiment having the above configuration, in the case of selection of the intermittent operation mode in the low load state that the load request is equal to or lower than the predefined reference value, the target voltage is set to the first target voltage Vmark1. After the load request exceeds the reference value, power generation of the fuel cell 100 is performed at the output voltage Vout that is higher than the first target voltage Vmark1 used in the intermittent operation mode. In the case of a subsequent shift to the low load state to select the intermittent operation mode again, the target voltage is set to the second target voltage Vmark2 that is higher than the first target voltage Vmark1. As described above, after power generation at the output voltage Vout that is higher than the first target voltage Vmark1 used in the intermittent operation mode, the second target voltage Vmark2 that is higher than the first target voltage Vmark1 is set to the target voltage at the subsequent time of selection of the intermittent operation mode. This suppresses a voltage variation of the fuel cell 100. This accordingly suppresses a variation in electrode potential of the fuel cell 100 and suppresses elution of an electrode catalyst for more specifically, the cathode electrode catalyst), thus enhancing the durability of the fuel cell 100.

According to this embodiment, in the intermittent operation mode setting routine, upon determination of the low load state that requires selection of the intermittent operation mode, the CPU first selects the non-power generation mode (step S320). In the low load state, the non-power generation mode is selected prior to the low power generation mode. This suppresses the fuel consumption in the low load state and improves the energy efficiency of the overall power supply system 30. At the time of selection of the low power generation mode, hydrogen is consumed for power generation. At the time of selection of the non-power generation mode, on the other hand, consumption of hydrogen is limited to the amount of hydrogen that is transmitted from the anode-side flow path 115 to the cathode-side flow path 148 across the electrolyte membrane and is oxidized on the cathode. This suppresses consumption of hydrogen. The supply amount of oxygen is to be increased at the time of selection of the low power generation mode with power generation, compared with at the time of selection of the non-power generation mode. This results in increasing the driving amount of the compressor 130 and thereby increasing the power consumption of the compressor 130.

According to this embodiment, in the control of the intermittent operation mode using the second target voltage Vmark2 that is higher than the first target voltage Vmark1 after power generation at the output voltage Vout higher than the first target voltage Vmark1, the low power generation mode is selected as the intermittent operation mode. At the time of selection of the low power generation mode, the fuel cell 100 generates electric power. This suppresses a decrease in SOC of the secondary battery 172 and reduces the frequency of charging the secondary battery 172. During charging of the secondary battery 172, there is a need to increase the driving amount of the compressor 130, in order to obtain an electric power required for charging from the fuel cell 100. Selection of the low power generation mode as the intermittent operation mode reduces the frequency of charging the secondary battery 172. This reduces the noise caused by increasing the driving amount of the compressor 130 during charging.

The target voltage set in the non-power generation intermittent operation control routine at step S320 may not be necessarily a constant voltage during execution of step S320. For example, the target voltage may be set to a higher target voltage when "there is a high likelihood that the load quickly provides a load request" and may be set to a lower target voltage when "there is a lower likelihood that the load quickly provides a load request". In the case where the target voltage in the non-power generation mode is varied during execution of step S320, the target voltage in the low power generation intermittent operation control routine at step S370 is to be set to the second target voltage Vmark2 that is higher than the first target voltage Vmark1, which is the target voltage immediately before release of the non-power generation mode of step S320.

According to this embodiment, a load request for charging the secondary battery 172 is specified as the non-reset load request at step S340, and a load request in an accelerator-on time is specified as the reset load request. This configuration is, however, not restrictive but may be replaced by another configuration. According to a modification, the non-reset load request may include a load request from the motor 170. It is, however, preferable that a load request from the motor 170 (main load) that is the primary load among the loads receiving supplies of electric power from the power supply system 30 is specified as the reset load request, and a load request from another load (auxiliary load) that has a lower required amount of power generation than the main load is specified as the non-reset load request. When there is a load request from the main load, resetting the determination of selecting the intermittent operation mode increases the likelihood that the operation mode employed first at the time of selection of the intermittent operation mode (i.e., in this embodiment, non-power generation mode with setting the lower first target voltage Vmark1 to the target voltage) is preferentially performed. Increasing the likelihood that the operation mode having the lower target voltage is preferentially performed in the control enhances the energy efficiency of the overall system.

According to this embodiment, the operation mode selected at the time of selection of the intermittent operation mode (first operation mode) is the non-power generation mode, and the operation mode selected after a non-reset load request (subsequent operation mode) is the low power generation mode. This configuration is, however, not restrictive and may be replaced by another configuration. According to one modification, the first operation mode may be the low power generation mode, and the subsequent operation mode may be the non-power generation mode. According to another modification, only the low power generation mode may be employed as the intermittent operation mode, and both the first operation mode and the subsequent operation mode may be the low power generation mode. According to yet another modification, only the non-power generation mode may be employed as the intermittent operation mode, and both the first operation mode and the subsequent operation mode may be the non-power generation mode.

The following configuration may be provided to employ only the non-power generation mode as the intermittent operation mode. At the shift position set to P range, the control may select the non-power generation mode with setting a lower target voltage as the first operation mode. In a shift to the low load state again after a non-reset load request, even when the shift position is kept to the P range, the control may select the non-power generation mode with setting a higher target voltage as the subsequent operation mode.

E. Cathode Purging at Selection of Low Power Generation Mode

When the low power generation mode is selected as the intermittent operation mode, water is produced on the cathode accompanied with power generation (progress of the electrochemical reaction). The water produced on the cathode may be accumulated in the form of liquid water on the cathode and the cathode-side flow path 148 close to the cathode. The accumulated liquid water may cause various problems. This embodiment accordingly performs a control of temporarily increasing the amount of oxygen (air flow rate) supplied to the cathode-side flow path 148 and blow out and remove the accumulated liquid water (hereinafter may be referred to as cathode purging). The following describes the details of cathode purging.

The ordinary operation mode has the higher amount of power generation and accordingly has the larger amount water produced accompanied with power generation than the low power generation mode. At the time of selection of the ordinary operation mode, however, a large amount of oxygen supplied to the cathode (i.e., high flow rate of the air) enables the produced water to be removed in the form of water vapor or to be blown off in the form of liquid water by the air supplied to the cathode-side flow path 148. At the time of selection of the low power generation mode, on the other hand, although the amount of water produced is less than the amount at the time of selection of the ordinary operation mode, a significantly low flow rate of the air makes it difficult to remove the produced water from the vicinity of the cathode and makes it likely to cause problems due to the accumulated liquid water.

The possible problems caused by accumulation of liquid water in the vicinity of the cathode include, for example, deterioration of subzero startability, reduction in output of the fuel cell 100, splash of water (a high volume of liquid water discharged from the fuel cell vehicle 20 is splashed on the user or the like who is in the vicinity of the fuel cell vehicle 20 to provide the user or the like with a feeling of discomfort), and oxidation of carbon at the anode catalyst.

The problem on deterioration of the sub-zero startability denotes a problem that the fuel cell 100 cannot be started smoothly on a restart of the power supply system 30 after a stop in the low temperature state that the operating environment of the fuel cell vehicle 20 is below 0° C. The liquid water accumulated in the vicinity of the cathode may be frozen during stop of the power supply system 30. In this case, the frozen water prevents a sufficient amount of oxygen to be supplied to the cathode at the time of a restart and thereby causes this problem.

The problem on reduction in output of the fuel cell 100 denotes a problem that the amount of power generation by the fuel cell 100 is gradually decreased during power generation of the fuel cell 100, due to accumulation of liquid water in the vicinity of the cathode. Accumulation of liquid water in the vicinity of the cathode gradually interrupts the supply of oxygen to the cathode and thereby causes this problem.

The problem on water splash denotes a problem that an undesirably large amount of water is discharged in the course of discharging liquid water accumulated in the cathode-side flow path 148 in the fuel cell 100. The power supply system 30 performs cathode purging when liquid water is accumulated in the cathode-side flow path 148 as described above. In the case where an excessive amount of liquid water is accumulated in the cathode-side flow path 148 due to delayed timing of cathode purging, the amount of liquid water discharged from the cathode-side flow path 148 to outside of the vehicle during cathode purging is likely to increase to an undesirably high level. In order to control the problem on water splash, there is a need to perform cathode purging at a sufficiently high frequency, so as to reduce the amount of liquid water discharged at a time.

The problem on oxidation of carbon at the anode catalyst denotes a problem that oxidation reaction (decomposition) of carbon having an electrode catalyst supported thereon proceeds at the anode in place of the normal electrochemical reaction in the fuel cell during power generation, due to accumulation of excessive liquid water at the anode and resulting deficiency of hydrogen at the anode. This problem is caused when an excessive amount of liquid water accumulated at the cathode is shifted across the electrolyte membrane to the anode and is accumulated at the anode to interfere with supply of hydrogen to the anode. The problem on oxidation of carbon is controlled by removing liquid water accumulated at the cathode before the liquid water is shifted to the anode and is accumulated excessively at the anode.

Figure 9:
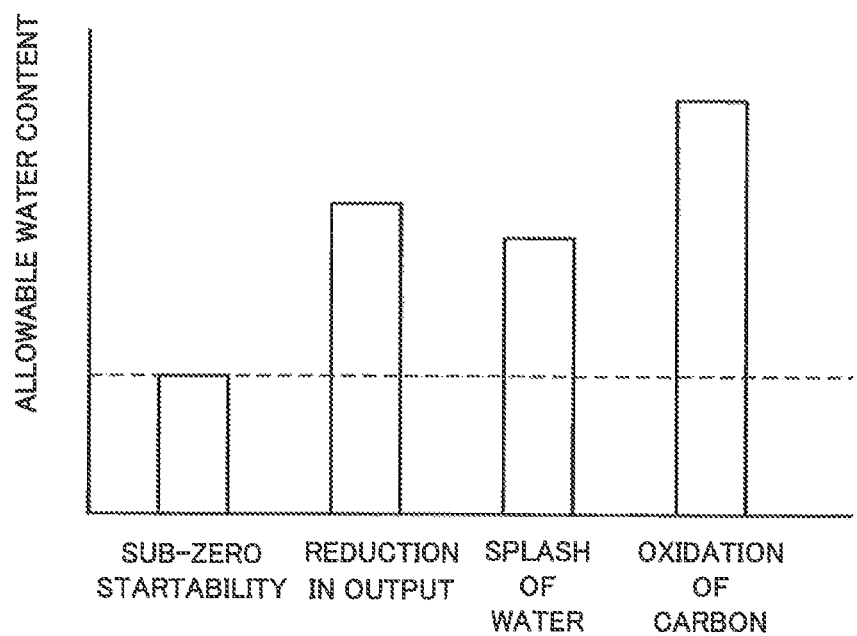
FIG. 9 is a diagram showing allowable amounts of water that do not cause respective problems.

FIG. 9 is a diagram conceptually showing the amount of water allowable in the cathode-side flow path 148 (hereinafter referred to as allowable water contents) that does not cause each of the above problems due to accumulation of liquid water in the vicinity of the cathode. The allowable water content that does not cause each of the above problems may be determined in advance by experiment or more specifically by continuing power generation in the low power generation mode while monitoring the amount of water production at the cathode that is calculated from the integrated amount of power generation and determining the total amount of water production that causes each of the above problems. In the case where the respective possible problems have different allowable water contents, the timing of cathode purging may be controlled, based on the minimum value among the allowable water contents of the respective problems (allowable water content with regard to the problem on sub-zero startability in FIG. 9).

One possible procedure of determining whether this is the timing of cathode purging (i.e., determining whether a liquid water accumulation condition that liquid water produced in the fuel cell during power generation of the fuel cell in the low power generation mode is excessively accumulated in the fuel cell) is satisfied) may continually calculate the amount of water production based on the integrated amount of power generation at the time of selection of the low power generation mode and determine whether the amount of water production reaches the above allowable water content. Another possible procedure may set in advance an elapsed time required for that the amount of water in the cathode-side flow path 148 reaches an amount of water corresponding to the liquid water accumulation condition and perform cathode purging at every set elapsed time. In the latter case, it is preferable to take into account, for example, the maximum value of the target amount of power generation at the time of selection of the low power generation mode and set the elapsed time such as to prevent an excessive amount of water from being accumulated in the cathode-side flow path 148 even with a variation in amount of power generation at the time of selection of the low power generation mode.

For cathode purging, the power supply system 30 of the embodiment fully opens the back pressure valve 143 and changes the valve-opening position of the flow-dividing valve 144 to supply the entire flow of the air taken in by the compressor 130 to the cathode-side flow path 148. The flow rate of the air (driving amount of the compressor 130) for cathode purging to sufficiently prevent the above problems caused by liquid water accumulated at the cathode may be determined in advance by experiment. The driving amount of the compressor 130 for cathode purging may thus be set based on the result of the experiment. In the case where the respective possible problems have different driving amounts of the compressor 130 required to prevent the problems, for example, the driving amount of the compressor 130 may be set based on the maximum value of the driving amount of the compressor 130 required to prevent the corresponding problem. Alternatively, the driving amount of the compressor 130 for cathode purging may be set based on the driving amount required to prevent the problem having the minimum amount of the allowable water content described above.

Increasing the flow rate of the air supplied to the cathode-side flow path 148 causes the supply amount of the air to be in excess to the amount of power generation. Accordingly, the fuel cell 100 generates electric power at an operation point on the IV characteristic at the time of selection of the ordinary operation mode shown in FIG. 5. During cathode purging, the target voltage of the fuel cell 100 is adequately selected at an operation point that is on the IV characteristic at the time of selection of the ordinary operation mode and that has an output voltage equal to or lower than the allowable upper limit. The cathode purging may thus be regarded as a process of selecting a cathode purging operation mode that temporarily interrupts the control in the low power generation mode and supplies an excess amount of oxygen, which is larger than the amount of oxygen supplied to the fuel cell 100 in the low power generation mode, to the fuel cell 100, in order to remove liquid water accumulated in the cathode-side flow path 148.

The supply amount of oxygen is increased during cathode purging as described above, so that the amount of power generation by the fuel cell 100 during cathode purging is larger than the amount of power generation at the time of selection of the low power generation mode. The excessively generated electric power is charged into the secondary battery 172. In the case where the secondary battery 172 has a high state of charge (SOC) and has difficulty in being charged with the electric power generated during cathode purging, the output voltage of the fuel cell 100 during cathode purging may be set above the allowable upper limit, so as to reduce the amount of power generation by the fuel cell 100 during cathode purging. The state of charge of the secondary battery 172 may be decreased, prior to cathode purging. The following describes such control.

Figure 10:
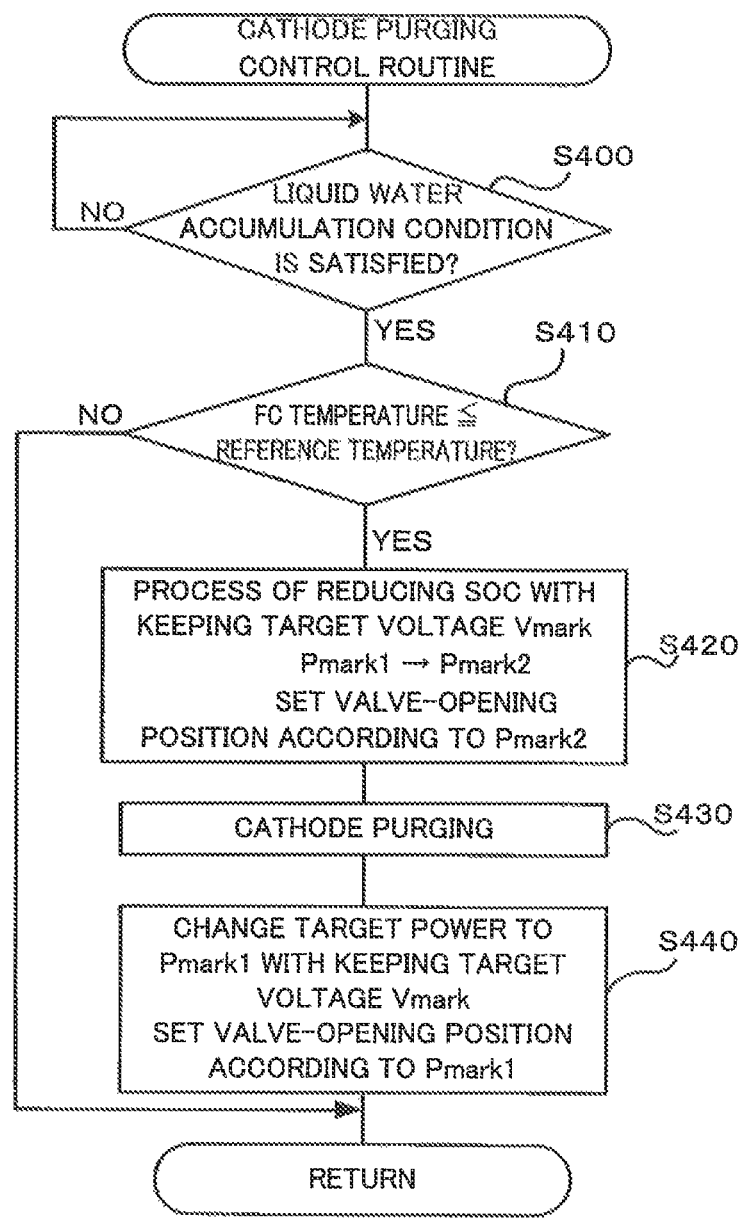
FIG. 10 is a flowchart showing a cathode purging control routine.

FIG. 10 is a flowchart showing a cathode purging control routine performed by the CPU of the controller 200 as a series of operations involved in cathode purging. This routine is triggered by selection of the low power generation anode in the power supply system 30 and is repeatedly performed until release of the low power generation mode.

On start of this routine, the CPU first determines whether the liquid water accumulation condition is satisfied (step S400). The determination of whether the liquid water accumulation condition is satisfied is described above in detail. The control procedure of this embodiment reduces the state of charge of the secondary battery 172, prior to cathode purging as described below. It is accordingly preferable to determine whether the liquid water accumulation condition is satisfied, in order to prevent the amount of water production at the cathode from exceeding the allowable water content described above at the time of cathode purging after the process of reducing the state of charge. For example, satisfaction of the liquid water accumulation condition may be determined at a stage prior to the timing when the amount of water production at the cathode reaches "a calculated amount by subtracting the amount of water production at the cathode during the process of reducing the state of charge from the allowable water content". The CPU repeats the determination of step S400 until satisfaction of the liquid water accumulation condition.

When it is determined at step S400 that the liquid water accumulation condition is satisfied, the CPU determines whether the internal temperature of the fuel cell 100 is equal to or lower than a predetermined reference temperature (step S410). When it is determined that the internal temperature of the fuel cell 100 is higher than the reference temperature, the CPU terminates this routine without performing cathode purging. At the higher internal temperature of the fuel cell 100, liquid water is more likely to be vaporized in the cathode-side flow path 148 and is thus more unlikely to be accumulated. When the internal temperature of the fuel cell 100 exceeds the reference temperature, the control procedure of this embodiment determines that the level of accumulation of liquid water in the cathode-side flow path 148 does not cause each of the above problems and thereby does not perform the cathode purging. The internal temperature of the fuel cell 100 may be obtained, for example, by detection of the temperature of the cooling medium discharged from the fuel cell 100. Alternatively a temperature sensor may be provided to directly detect the internal temperature of the fuel cell 100. When the internal temperature of the fuel cell 100 exceeds the reference temperature, a modified control procedure may perform cathode purging with reducing the flow rate of the supplied air (i.e., reducing the driving amount of the compressor 130). When the internal temperature of the fuel cell 100 exceeds the reference temperature, another modified control procedure may extend the time interval of cathode purging. Another modification may not change the control flow based on the internal temperature of the fuel cell 100.

When it is determined at step S410 that the internal temperature of the fuel cell 100 is equal to or lower than the reference temperature, the CPU performs a process of reducing the state of charge (SOC) of the secondary battery 172 (step S420). More specifically, the CPU changes the target amount of power generation from a target amount of power generation Pmark1 used in the low power generation mode from a lower target amount of power generation Pmark2, while keeping the target voltage of the fuel cell 100 at a target voltage Vmark used in the low power generation mode. In other words, the valve-opening position of the back pressure valve 143 is adjusted the valve-opening position of the back pressure valve 143 is changed in the closing direction to decrease the supply amount of oxygen), in order to provide a supply amount of oxygen that makes the amount of power generation equal to the target amount of power generation Pmark2 at the output voltage set to the target voltage Vmark.

The target amount of power generation Pmark2 at step S420 may be set, for example, according to a level of reducing the state of charge of the secondary battery 172 as described below. The target voltage of the fuel cell 100 during cathode purging is set in advance, so that the amount of power generation during cathode purging is determined at the operation point on the IV characteristic at the time of selection of the ordinary operation mode. This accordingly indicates a level of reducing the SOC of the secondary battery 172 prior to charging (target state of charge), in order to cause the secondary battery 172 to be charged with excessive electric power generated during cathode purging.

In the case where the amount of power generation of the fuel cell 100 is less than a load request from the vehicle auxiliary machinery and the fuel cell auxiliary machinery, the secondary battery 172 may cover shortage of electric power and thereby decrease its SOC. According to this embodiment, a time duration of continuing the process at step S420 is set in advance. The CPU thus compares the current SOC of the secondary battery 172 with the target state of charge and sets the target amount of power generation Pmark2 at step S420 by taking into account the load request from the auxiliary machinery, in order to reduce the SOC of the secondary battery 172 to the target state of charge within a preset time duration as the time duration of continuing the process at step S420.

After performing the process of reducing the SOC at step S420, the CPU performs cathode purging (step S430). After performing the cathode purging at step S430, the CPU changes the control to the low power generation mode (step S440) and terminates this routine. More specifically, the CPU returns the target amount of power generation to the target amount of power generation Pmark1 in the low power generation mode while keeping the target voltage of the fuel cell 100 at the target voltage Vmark, and regulates the valve-opening position of the back pressure valve 143 and the driving amount of the compressor 130 to provide the supply amount of oxygen that makes the amount of power generation equal to the target amount of power generation Pmark1.

Performing the cathode purging prevents the above respective problems caused by water produced at the cathode, even when the low power generation mode continues for a long time period. The process of reducing the SOC of the secondary battery 172 prior to cathode purging enables the secondary battery 172 to be charged with excessive electric power generated during cathode purging. This accordingly enables cathode purging to be performed at any desired timing with no difficulty.

F. Modifications

Modification 1

In the embodiment described above, the back pressure valve 143 provided in the second air flow path 145 is used as the flow rate regulator provided in the oxygen supply path to change the amount of oxygen supplied to the cathode. This configuration is, however, not restrictive but may be replaced by a different configuration. For example, the supply amount of oxygen may be regulated by controlling the valve-opening position of a throttle valve provided in a flow path for supplying oxygen to the fuel cell 100 (upstream-side flow path), in place of the back pressure valve 143 that is a throttle valve provided in a flow path which oxygen discharged from the fuel cell 100 flows (downstream-side flow path). In another example, the supply amount of oxygen may be regulated by controlling the valve-opening positions of two throttle valves provided in both the downstream-side flow path and the upstream-side flow path. In such modified configurations, providing a flow rate regulator that is capable of adjusting the amount of oxygen supplied to the cathode allows for the similar control as that of the above embodiment.

In the embodiment described above, at the time of selection of the non-power generation mode, the supply amount of oxygen is controlled to make the OCV of the fuel cell 100 equal to the target voltage Vmark by changing the valve-opening position of the back pressure valve 143 while fixing the driving amount of the compressor 130 and the valve-opening position of the flow-dividing valve 144. This configuration is, however, not restrictive but may be replaced by a different configuration. For example, the supply amount of oxygen may be controlled by a control procedure other than the method of changing only the valve-opening position of the back pressure valve 143, i.e., a method of changing at least one selected among the driving amount of the compressor 130 (i.e., amount of oxygen introduced by the oxygen introducer), the valve-opening position of the flow-dividing valve 144 and the valve-opening position of the back pressure valve 143 (i.e., valve-opening position of the flow rate regulator).

In the embodiment described above, the bypass flow path (third air flow path 140) is provided in the oxygen supply path. The control in the intermittent operation mode regulates the valve-opening position of the flow-dividing valve 144 and the valve-opening position of the back pressure valve 143 (i.e., valve-opening position of the flow rate regulator) to supply an amount of oxygen that is equal to or lower than a lower limit of the supply amount of oxygen of the compressor 130, to the cathode. This configuration is, however, not restrictive but may be replaced by a different configuration. For example, a compressor that is capable of regulating the supply amount of oxygen to a desired flow rate at the time of selection of the intermittent operation mode may be provided, in place of or in addition to the compressor 130. The supply amount of oxygen may be regulated by controlling the driving amount of this compressor. This configuration also allows for control in the intermittent operation mode by regulating the supply amount of oxygen based on the voltage value Vme and the amount of power generation Pme without measuring the supply amount of oxygen.

Modification 2

In the embodiment described above, the control procedure in the non-power generation mode obtains the average cell voltage calculated by dividing the OCV of the entire cell stack by the number of cells as the voltage value Vme at step S110 and compares the obtained average cell voltage with the target voltage Vmark at step S130 (FIG. 6). This configuration is, however, not restrictive but may be replaced by a different configuration. For example, the voltage of each of the unit cells constituting the fuel cell 100 may be measured individually, and the minimum cell voltage or the maximum cell voltage may be used as the voltage value Vme. Using the minimum cell voltage as the voltage value Vme is advantageous in terms of suppressing an excessive decrease in voltage of each unit cell and thereby suppressing excessive reduction of the electrode catalyst at the cathode. Using the maximum cell voltage as the voltage value Vme is advantageous, on the other hand, in terms of suppressing an excessive increase in voltage of each unit cell and thereby suppressing excessive elution of the electrode catalyst at the cathode.

In the above embodiment, part or all of the functions and the processes implemented by the software configuration may be configured by hardware. Part or all of the functions and the processes implemented by the hardware configuration may be configured by software. The hardware configuration includes, for example, integrated circuits, discrete circuits, circuit modules as combinations of these circuits, and other various circuits.

The invention is not limited to any of the embodiment, the examples and the modifications described above but may be implemented by a diversity of other configurations without departing from the scope of the invention. For example, the technical features of any of the embodiment, examples and modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A power supply system comprising a fuel cell that supplies electric power to a load, the power supply system further comprising:
    an oxygen supply system that is configured to supply oxygen to a cathode of the fuel cell; and
    an oxygen supply regulator that is configured to drive the oxygen supply system and regulate an amount of oxygen that is supplied to the cathode by the oxygen supply system, wherein
    in an ordinary load state in which a required electric power from the load is higher than a predetermined reference value, the oxygen supply regulator is configured to drive the oxygen supply system to supply a first amount of oxygen to the cathode, the first amount of oxygen causing at least part of the required electric power to be supplied from the fuel cell, and
    in a low load state in which the required electric power is equal to or lower than the predetermined reference value, the oxygen supply regulator is configured to drive the oxygen supply system to supply an amount of oxygen to the cathode that is less than the first amount of oxygen and that is required to make a voltage of the fuel cell equal to a predetermined target voltage, wherein
    in a first occurrence of the low load state, the oxygen supply regulator is configured to drive the oxygen supply system with the predetermined target voltage set to a first target voltage, and
    after a shift from the first occurrence of the low load state to a power generation control state in which the required electric power becomes higher than the predetermined reference value to cause the fuel cell to generate electric power at an output voltage that is higher than the first target voltage, followed by a shift to a second occurrence of the low load state, the oxygen supply regulator is configured to drive the oxygen supply system with the predetermined target voltage set to a second target voltage that is higher than the first target voltage.

2. The power supply system according to claim 1, further comprising:
    an operation mode selector that is configured to select one operation mode among a plurality of operation modes as an operation mode of the power supply system in the low load state, the plurality of operation modes including a non-power generation mode that causes the fuel cell to stop power generation and a low power generation mode that causes the fuel cell to supply electric power to the load;
    a load disconnector that is configured to electrically disconnect the fuel cell from the load when the operation mode selector selects the non-power generation mode as the operation mode of the power supply system in the low load state; and
    an output voltage controller that is configured to set the output voltage of the fuel cell to the target voltage when the operation mode selector selects the low power generation mode as the operation mode of the power supply system in the low load state, wherein
    when the operation mode selector selects the non-power generation mode as the operation mode of the power supply system in the low load state, the oxygen supply regulator is configured to drive the oxygen supply system to supply an amount of oxygen that is required to make an open circuit voltage of the fuel cell equal to the target voltage, to the fuel cell, and
    when the operation mode selector selects the low power generation mode as the operation mode of the power supply system in the low load state, the oxygen supply regulator is configured to drive the oxygen supply system to supply a required amount of oxygen that is theoretically determined from a predetermined target amount of power generation of the fuel cell, to the fuel cell.

3. The power supply system according to claim 2, wherein in a shift from the ordinary load state to the low load state, the operation mode selector is configured to select the non-power generation mode, in which the target voltage is set to the first target voltage, as the operation mode of the power supply system in the low load state, and
    after a subsequent shift from the low load state to the power generation control state followed by a shift to the low load state, the operation mode selector is configured to select the low power generation mode, in which the target voltage is set to the second target voltage, as the operation mode of the power supply system in the low load state.

4. The power supply system according to claim 3, wherein the load includes a main load and an auxiliary load that has a lower required electric power than the main load,
    the ordinary load state is a state that requires electric power from at least the main load, and
    the low load state is a state that requires electric power from the auxiliary load without requiring electric power from the main load.

5. The power supply system according to claim 2, wherein during continuation of a state in which the operation mode selector selects the low power generation mode, in which the target voltage is set to the second target voltage, upon satisfaction of a liquid water accumulation condition that liquid water produced in the fuel cell during power generation of the fuel cell in the low power generation mode is excessively accumulated in the fuel cell, the operation mode selector is configured to temporarily cancel the selection of the low power generation mode, and
    when the operation mode selector temporarily cancels the selection of the low power generation mode, the oxygen supply regulator is configured to drive the oxygen supply system to supply an excess amount of oxygen to the fuel cell, the excess amount of oxygen being greater than an amount of oxygen supplied to the fuel cell in the low power generation mode.

6. The power supply system according to claim 5, further comprising
    a power storage unit configured to store at least part of the electric power generated by the fuel cell while the low power generation mode is selected by the operation mode selector, wherein
    during continuation of the state in which the operation mode selector selects the low power generation mode, upon satisfaction of the liquid water accumulation condition, the oxygen supply regulator is configured to reduce the target amount of power generation of the fuel cell and to drive the oxygen supply system, prior to temporary cancellation of the selection of the low power generation mode by the operation mode selector.

7. The power supply system according to claim 1, wherein the oxygen supply system comprises:
- an oxygen supply path that is provided as a flow path connected with the cathode, wherein part of the flow path forms a cathode-side flow path inside of the fuel cell to supply oxygen to the cathode;
- an oxygen introducer that is configured to introduce oxygen to a position upstream of the cathode-side flow path in the oxygen supply path;
- a bypass flow path that is provided as a flow path branching off from the oxygen supply path to introduce oxygen supplied from the oxygen introducer by bypassing the cathode-side flow path;
- a flow-dividing valve that is provided at a position where the bypass flow path is branched off from the oxygen supply path and is configured to change a distribution ratio of oxygen into the oxygen supply path and the bypass flow path by regulating a valve-opening position thereof; and
- a flow rate regulator that is provided in the oxygen supply path to change an amount of oxygen supplied to the cathode, wherein
- the oxygen supply regulator is configured to adjust the amount of oxygen supplied to the cathode by changing at least one of an amount of oxygen introduced by the oxygen introducer, the valve-opening position of the flow-dividing valve, or a valve-opening position of the flow rate regulator.

\* \* \* \* \*